US007965978B2

(12) United States Patent
Fujii

(10) Patent No.: US 7,965,978 B2
(45) Date of Patent: Jun. 21, 2011

(54) TRANSMITTING/RECEIVING METHOD, TRANSMITTER/RECEIVER, AND RECORDING MEDIUM THEREFOR

(75) Inventor: Osamu Fujii, Yaita (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 576 days.

(21) Appl. No.: 12/072,470

(22) Filed: Feb. 26, 2008

(65) Prior Publication Data

US 2008/0280557 A1 Nov. 13, 2008

Related U.S. Application Data

(60) Provisional application No. 60/903,605, filed on Feb. 27, 2007.

(30) Foreign Application Priority Data

Jan. 24, 2008 (JP) ................................ 2008-014088

(51) Int. Cl.
*H04Q 7/32* (2006.01)

(52) U.S. Cl. ......... 455/7; 455/11.1; 455/3.06; 455/3.05; 455/73; 455/74; 381/1; 381/14; 381/311; 370/315; 370/317; 370/321; 370/326

(58) Field of Classification Search ............. 455/7, 11.1, 455/3.06, 3.05, 73, 74, 67.11; 381/1, 14, 381/311; 370/315, 317, 321, 326
See application file for complete search history.

(56) References Cited

U.S. PATENT DOCUMENTS

| | | | | |
|---|---|---|---|---|
| 7,080,006 | B1 | 7/2006 | Kupferschmidt et al. | |
| 2003/0091194 | A1 | 5/2003 | Teichmann et al. | |
| 2010/0030838 | A1 * | 2/2010 | Atsmon et al. | 709/200 |
| 2010/0130198 | A1 * | 5/2010 | Kannappan et al. | 455/434 |

FOREIGN PATENT DOCUMENTS

| | | |
|---|---|---|
| FR | 2 790 845 A | 9/2000 |
| GB | 2 372 892 A | 9/2002 |
| JP | 9-18507 | 1/1997 |
| JP | 2002-351500 | 12/2002 |
| JP | 2004500599 | 1/2004 |

OTHER PUBLICATIONS

S.G. Cossette et al., "New Techniques for Audio Metadata Use and Distribution", Proceeding of The Audio Engineering Convention Society, AES 117th, Sep. 24, 1999, pp. 1-11, XP0024.
MP3 Standard, ISO/IEC, 1992, p. 40, 11172-3 rev.
AAC Standard, ISO/IEC, 2003, pp. 78-79, 13818-7.

* cited by examiner

*Primary Examiner* — Keith T Ferguson
(74) *Attorney, Agent, or Firm* — Day Pitney LLP

(57) ABSTRACT

A transmitting/receiving method that can easily detect an influence exerted in transmission channels at a transmitter/receiver is provided. An acquiring unit 12 acquires left audio data and right audio data of audio data received by a metadata calculator 1. An adding unit 141 then calculates added data based on an added value for a predetermined time of a sum of the acquired left audio data and right audio data. Similarly, a subtracting unit 142 calculates subtracted data based on an added value for predetermined time of a difference between the acquired right audio data and left audio data. An addition unit 17 adds the added data and the subtracted data calculated by these adding unit 141 and subtracting unit 142 to the received audio data, and a transmission unit 18 transmits the audio data to which the added data and the subtracted data are added.

7 Claims, 20 Drawing Sheets

FIG. 3

| matrix_mixdown_idx | A |
|---|---|
| 0 | $1/\sqrt{2}$ |
| 1 | $1/2$ |
| 2 | $1/(2\sqrt{2})$ |
| 3 | 0 |

FIG. 5

METADATA HOLDING UNIT 13

| STATION ID | DEVICE ID | METADATA |
|---|---|---|
| 01 | XXX | — |
| 02 | XXX | — |
| 03 | XXX | — |
| 04 | XXX | — |

FIG. 9

THRESHOLD TABLE 143

| | THRESHOLD |
|---|---|
| ADDED DATA | X |
| SUBTRACTED DATA | Y |
| ADDED DATA AND SUBTRACTED DATA | ADDED DATA x<br>SUBTRACTED DATA y |

FIG. 11

THRESHOLD FILE 161

| | THRESHOLD |
|---|---|
| FIRST THRESHOLD | X |
| SECOND THRESHOLD | Y |
| THIRD THRESHOLD | x |
| FOURTH THRESHOLD | y |

TRANSMITTING/RECEIVING METHOD, TRANSMITTER/RECEIVER, AND RECORDING MEDIUM THEREFOR

CROSS-REFERENCE TO RELATED APPLICATION

This Nonprovisional application claims priorities under 35 U.S.C. §119(e) on U.S. Provisional application No. 60/903,605 filed on Feb. 27, 2007, and under 35 U.S.C. §119(a) on Patent Application No. 2008-14088 filed in Japan on Jan. 24, 2008, the entire contents of which are hereby incorporated by reference.

BACKGROUND

1. Technical Field

The present invention relates to a transmitting/receiving method for receiving audio acoustic signals externally transmitted at a transmitter/receiver, and externally transmitting the received audio acoustic signals from the transmitter/receiver, and a transmitter/receiver and a recording medium for operating the transmitter/receiver.

2. Description of the Related Art

Modulated information is transmitted from a key station to user tuners via a plurality of relay stations in digital broadcasts. Since various noises may be mixed in communication channels in transmitting the information, error correction techniques or the like are adopted to reduce this influence (for example, refer to Patent Document 1). Additionally, an M/S stereo technique using a correlation between channels, or the like is adopted as a highly efficient coding method of MP3 (MPeg-1 audio layer 3) or AAC (Advanced Audio Codec). (For example, refer to Non-Patent Documents 1 and 2)

[Patent Document 1] Japanese Patent Application Laid-Open No. 9-18507

[Non-Patent Document 1] ISO/IEC 11172-3

[Non-Patent Document 2] ISO/IEC 13818-7

However, various noises, such as a random noise or a burst noise may exert an influence thereon in transmitting the information. Audio data as well as image data may be influenced by the noises or the like in transmission channels, and thus it has needed to detect this effectively and with simple processing. Means for solving the problems is not described in Patent Document 1, and Non-Patent Documents 1 and 2.

SUMMARY

The present invention is made in view of the situations described above. It is an object of the present invention to provide a transmitting/receiving method allowing to easily detect an influence exerted in transmission channels at a transmitter/receiver, by adding added data and subtracted data calculated based on a first audio acoustic signal and a second audio acoustic signal in audio acoustic signals, to the audio acoustic signals, and a transmitter/receiver and a recording medium for operating the transmitter/receiver.

A transmitting/receiving method in accordance with the present invention is, in a transmitting/receiving method for receiving audio acoustic signals externally transmitted at a transmitter/receiver and externally transmitting the received audio acoustic signals from the transmitter/receiver, characterized by including the steps of acquiring a first audio acoustic signal and a second audio acoustic signal in the received audio acoustic signals, calculating a value on a time-series sum signal of the first audio acoustic signal and the second audio acoustic signal acquired at the acquiring step to calculate added data based on an accumulated value for a predetermined time of the calculated values, calculating a value on a time-series difference signal between the first audio acoustic signal and the second audio acoustic signal acquired at the acquiring step to calculate subtracted data based on an accumulated value for a predetermined time of the calculated values, adding the added data and the subtracted data calculated at the adding step and the subtracting step to the audio acoustic signals received as metadata, and externally transmitting the audio acoustic signals to which the metadata is added at the adding step.

A transmitter/receiver in accordance with the present invention is in a transmitter/receiver for receiving audio acoustic signals externally transmitted, and externally transmitting the received audio acoustic signals, characterized by including an acquiring unit for acquiring a first audio acoustic signal and a second audio acoustic signal of the received audio acoustic signals, an adding unit for calculating a value on a time-series sum signal of the first audio acoustic signal and the second audio acoustic signal acquired by the acquiring unit to calculate added data based on an accumulated value for a predetermined time of the calculated values, a subtracting unit for calculating a value on a time-series difference signal between the first audio acoustic signal and the second audio acoustic signal acquired by the acquiring unit to calculate subtracted data based on an accumulated value for a predetermined time of the calculated values, an addition unit for adding the added data and the subtracted data calculated by the adding unit and the subtracting unit to the audio acoustic signals received as metadata, and a transmission unit for externally transmitting the audio acoustic signals to which the metadata is added by the addition unit.

The transmitter/receiver in accordance with the present invention is characterized in that when the received audio acoustic signals include a plurality of audio acoustic signals exceeding the first audio acoustic signal and the second audio acoustic signal, the acquiring unit is configured so as to convert the plurality of audio acoustic signals into the first audio acoustic signal and the second audio acoustic signal.

The transmitter/receiver in accordance with the present invention is characterized by including an identification information addition unit for adding identification information assigned in advance to the added data and the subtracted data calculated by the adding unit and the subtracting unit.

The transmitter/receiver in accordance with the present invention is characterized by including an extracting unit for extracting the added data and the subtracted data which are added in advance to the received audio acoustic signals, and a detecting unit for detecting malfunctions of the received audio acoustic signals based on the added data or the subtracted data extracted by the extracting unit, and the added data or the subtracted data calculated by the adding unit or the subtracting unit.

The transmitter/receiver in accordance with the present invention is characterized in that an amount of information assigned to the subtracted data is equal to an amount of information assigned to the added data or less.

A recording medium in accordance with the present invention is, in a recording medium used for a transmitter/receiver for receiving audio acoustic signals externally transmitted, and externally transmitting the audio acoustic signals, characterized by causing a transmitter/receiver to execute the steps of calculating a value on a time-series sum signal of a first audio acoustic signal and a second audio acoustic signal acquired from the received audio acoustic signals to calculate added data based on an accumulated value for a predetermined time of the calculated values, calculating a value on a time-series difference signal between the first audio acoustic signal and the second audio acoustic signal acquired from the received audio acoustic signals to calculate subtracted data based on an accumulated value for a predetermined time of the calculated values, and adding the added data and the subtracted data calculated at the adding step and the subtracting step to the audio acoustic signals received as metadata.

According to the present invention, an acquiring unit acquires the first audio acoustic signal and the second audio acoustic signal of the audio acoustic signals received at the transmitter/receiver. An adding unit then calculates a value on a time-series sum signal of the acquired first audio acoustic signal and second audio acoustic signal to calculate added data based on an accumulated value for a predetermined time of the calculated values. Similarly, a subtracting unit calculates a value on a time-series difference signal between the acquired first audio acoustic signal and second audio acoustic signal to calculate subtracted data based on an accumulated value for a predetermined time of the calculated values. An addition unit adds the added data and the subtracted data calculated by these adding unit and subtracting unit to the audio acoustic signals received as metadata, and a transmission unit externally transmits the audio acoustic signals to which the metadata is added. As a result of this, the data indicating the characteristics of the audio acoustic signals is added by the transmitter/receiver in transmission channels, allowing noises and the like to be analyzed based on this. In particular, it is possible to effectively detect in-phase noises by the added data based on the sum of the first audio acoustic signal and the second audio acoustic signal. Additionally, it is also possible to effectively detect reverse-phase noises by the subtracted data based on the difference between the first audio acoustic signal and the second audio acoustic signal.

In the present invention, when the received audio acoustic signals include a plurality of audio acoustic signals exceeding the first audio acoustic signal and the second audio acoustic signal, the plurality of audio acoustic signals are converted into the first audio acoustic signal and the second audio acoustic signal. As a result of this, even when the audio acoustic signals are, for example, 5.1ch audio, it is possible to effectively detect the data based on malfunctions of the audio acoustic signals while reducing an amount of information.

According to the present invention, an identification information addition unit adds identification information assigned in advance to the added data and the subtracted data calculated by the adding unit and the subtracting unit. As a result, it is possible to grasp a change in the added data and the subtracted data among respective transmitters/receivers.

According to the present invention, an abnormal output unit outputs signals for indicating malfunctions when the added data calculated by the adding unit or the subtracted data calculated by the subtracting unit exceeds a threshold stored in a storing unit. As a result of this, the malfunctions in transmission channels can be found in an early stage. In addition, outputting the malfunctions by the transmitter/receiver leads to use another transmitter/receiver in another transmission channel; thereby high quality audio acoustic signals can be transmitted.

According to the present invention, an extracting unit extracts the added data and the subtracted data which are added in advance to the received audio acoustic signals. A detecting unit detects malfunctions of the received audio acoustic signals based on the added data or the subtracted data extracted by the extracting unit, and the added data or the subtracted data calculated by the adding unit or the subtracting unit. As a result of this, malfunctions can be simply detected in comparison with the added data and the subtracted data added by the transmitter/receiver at a preceding stage.

The above and further objects and features of the invention will more fully be apparent from the following detailed description with accompanying drawings.

BRIEF DESCRIPTION OF THE SEVERAL VIEWS OF THE DRAWINGS

FIG. 3 is a table indicating values of coefficient A;

FIG. 5 is an explanatory view showing a record layout in a metadata holding unit;

FIG. 9 is an explanatory view showing a record layout of a threshold table;

FIG. 11 is an explanatory view showing a record layout in a threshold file;

DETAILED DESCRIPTION

First Embodiment

Figure 1:
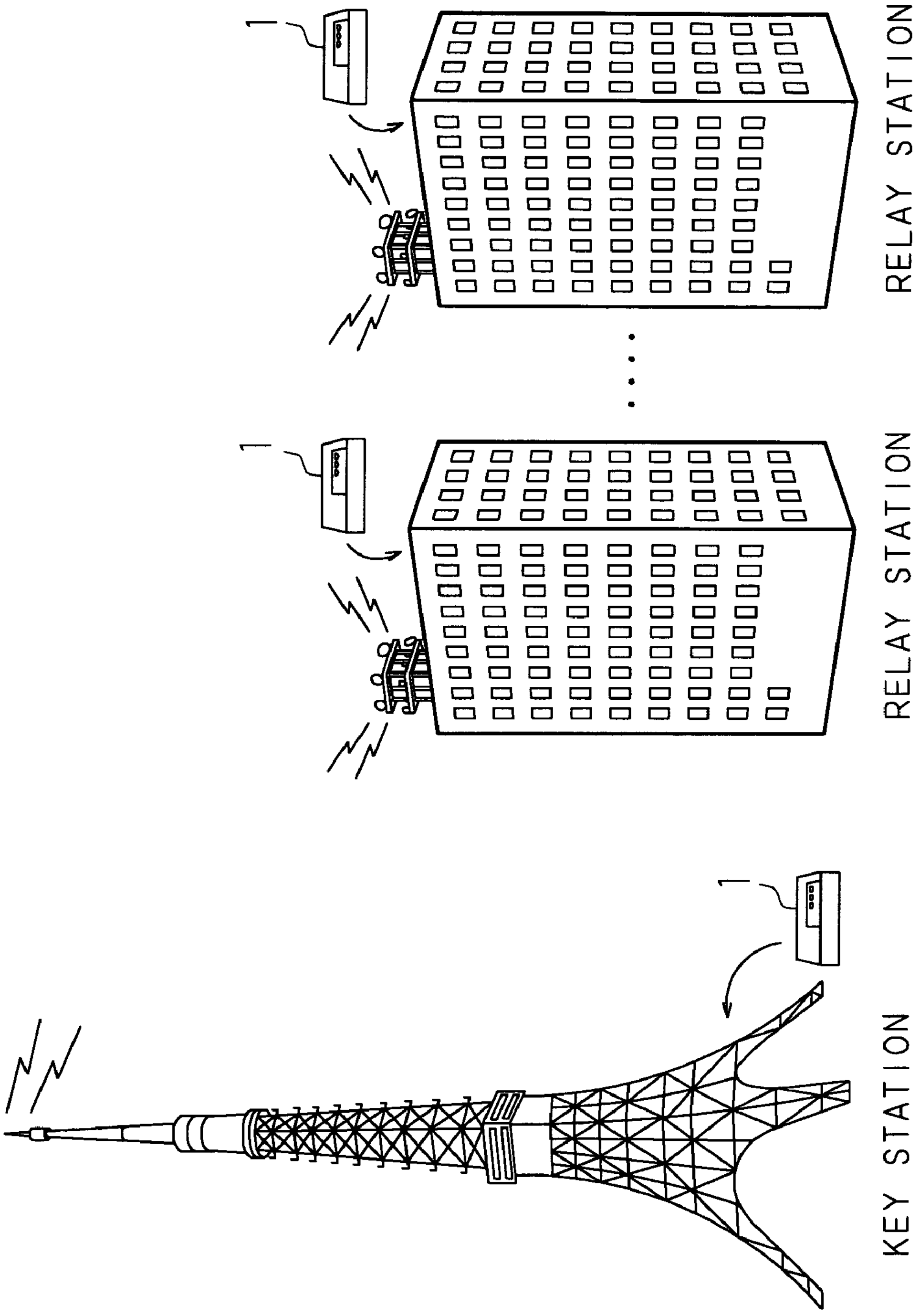
FIG. 1 is a schematic view showing an outline of a transmission system.

Hereinafter, embodiments will be described with reference to the drawings. FIG. 1 is a schematic view showing an outline of a transmission system. The transmission system is configured with a transmitter/receiver 1 provided in a key station, transmitters/receivers 1, 1, . . . provided in relay stations. Produced image data and program materials including audio acoustic signals (hereinafter, referred to as audio data) are transmitted to the key station via the plurality of relay stations. Thereafter, the image data and the audio data are processed at a broadcast station to be transmitted from the key station to user tuners which are not shown in the drawing via the relay stations. The transmitters/receivers 1 provided in the key station and the relay stations analyze the audio data in broadcasting data to thereby calculate added data and subtracted data (hereinafter collectively referred to as metadata in some cases), which indicate a characteristic amount of the audio data. The transmitter/receiver 1 (hereinafter referred to as a metadata calculator 1) calculates metadata from the received audio data. The metadata calculator 1 adds the calculated metadata to the audio data, and then transmitting it to the metadata calculator 1 in the relay station at the subsequent stage. Hereinafter, the metadata calculator 1 for transmitting the audio data is referred to as a preceding stage, while the metadata calculator 1 for receiving the audio data from that metadata calculator 1 is referred to as a subsequent stage.

Figure 2:
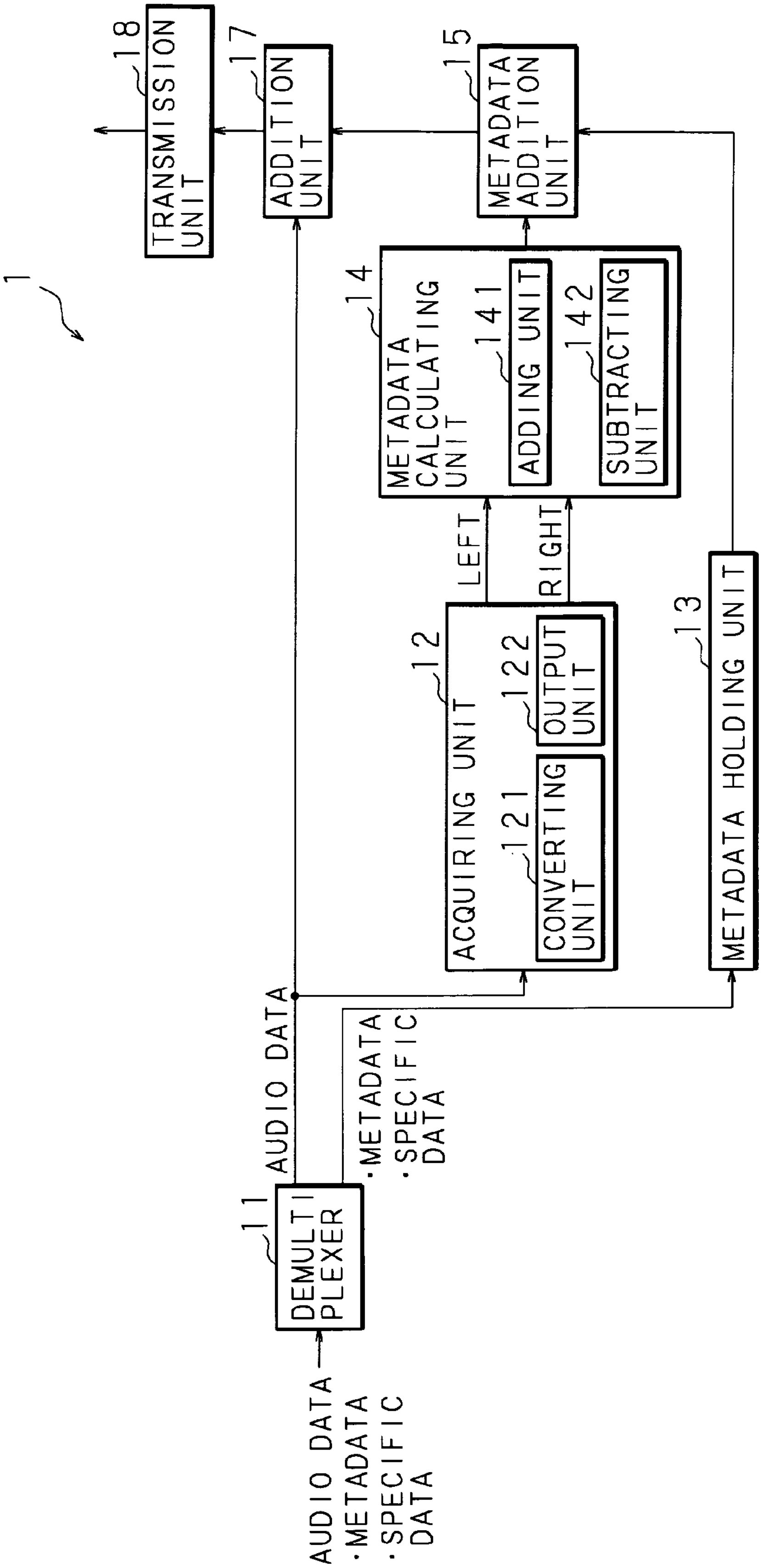
FIG. 2 is a block diagram showing a hardware configuration of a metadata calculator.

FIG. 2 is a block diagram showing a hardware configuration of the metadata calculator 1. The metadata calculator 1 is configured so as to include a demultiplexer 11, an acquiring unit 12, a metadata holding unit 13, a metadata calculating unit 14, a metadata addition unit 15, an addition unit 17, a transmission unit 18, and the like. Note that, LSI (Large Scale integration) circuits may be used for these units. AV streams compressed according to MPEG (Moving Pictures Experts Group) specification are inputted into the metadata calculator 1. Although both of the image data and the audio data are included in the AV stream, description of the image data will be omitted in the present embodiment. The audio data is encoded according to AAC, AC3 (Audio Code number 3) format, or the like, and the audio data decoded by a decoder which is not shown in the drawing and specific data (identification information) which will be described later are inputted into the metadata calculator 1. Meanwhile, when the produced image data and audio data are transmitted to the key station (broadcast station), the uncompressed audio data may be transmitted thereto.

The audio data and the specific data inputted into the metadata calculator 1 are inputted into the demultiplexer 11 which operates as an extracting unit. The demultiplexer 11 extracts the metadata and the specific data added to the audio data, and then separates and outputs the extracted metadata and specific data and the audio data from which the metadata and the specific data are removed. Incidentally, this added metadata is the metadata calculated by the metadata calculator 1 in the key station or the relay stations at the preceding stage. The calculating processing of this metadata and contents of the specific data will be described later. The audio data separated by the demultiplexer 11 is outputted to the addition unit 17 and the acquiring unit 12, respectively. The metadata and the specific data separated by the demultiplexer 11 are outputted to the metadata holding unit 13.

The acquiring unit 12 acquires a first audio data (hereinafter, referred to as left audio data) and a second audio data (hereinafter, referred to as right audio data) of the inputted audio data to then output the left audio data and the right audio data to the metadata calculating unit 14. That is, the acquiring unit 12 respectively acquires the left audio data and the right audio data when the audio data is configured of 2ch of a left channel and a right channel to then output the acquired left audio data and right audio data to the metadata calculating unit 14.

When the audio data is composed of 2ch, the acquiring unit 12 performs the aforementioned processing, but the audio data is composed of 3ch or more exceeding 2ch, the audio data composed of a plurality of channels equal to 3ch or more is converted into the audio data of 2ch (down mixed) composed of the left audio data and the right audio data by a converting unit 121. An output unit 122 outputs the converted left audio data and right audio data of 2ch to the metadata calculating unit 14. An equation for converting the audio data composed of 3ch or more into the audio data composed of 2ch is stored in the converting unit 121, and the converting unit 121 performs a conversion according to the equation. The audio data composed of, for example, 5.1ch will be described in the present embodiment.

Supposing that the audio data to be inputted is composed of left audio data L, right audio data R, center audio data C, left surround data Ls, and right surround data Rs, left audio data L' and right audio data R' after the conversion can be expressed with following Equation (1) according to ISO/IEC 13818-7.

[Equation 1]

$$L' = \frac{1}{1 + \frac{1}{\sqrt{2}} + A}\left(L + \frac{C}{\sqrt{2}} + A \cdot Ls\right) \tag{1}$$

$$R' = \frac{1}{1 + \frac{1}{\sqrt{2}} + A}\left(R + \frac{C}{\sqrt{2}} + A \cdot Rs\right)$$

FIG. 3 is a table indicating values of the coefficient A. These values are based on the description in ISO/IEC 13818-7, 8.3.7.5, and the value of A is determined according to a value of matrix_mixdown_idx. The table shown in FIG. 3 is also stored in the converting unit 121. As described above, the audio data converted into the left audio data and the right audio data by the converting unit 121 are outputted to the metadata calculating unit 14 via the output unit 122. Note herein that, the example of 5.1ch audio data has been described in the present embodiment, but an embodiment to convert 7.1ch audio data or the like may be employed.

The metadata calculating unit 14 is configured to include an adding unit 141 and a subtracting unit 142. The adding unit 141 calculates a value on a time-series sum signal of the left audio data and the right audio data to thereby calculate added data based on an accumulated sum value of the calculated values for a predetermined time. Meanwhile, the subtracting unit 142 calculates a value on a time-series difference signal of the left audio data and the right audio data to thereby calculate subtracted data based on an accumulated value of the calculated values for the predetermined time. The calculated added data and subtracted data are outputted to the metadata addition unit 15 as metadata. Details will be described hereinbelow.

Figure 4:
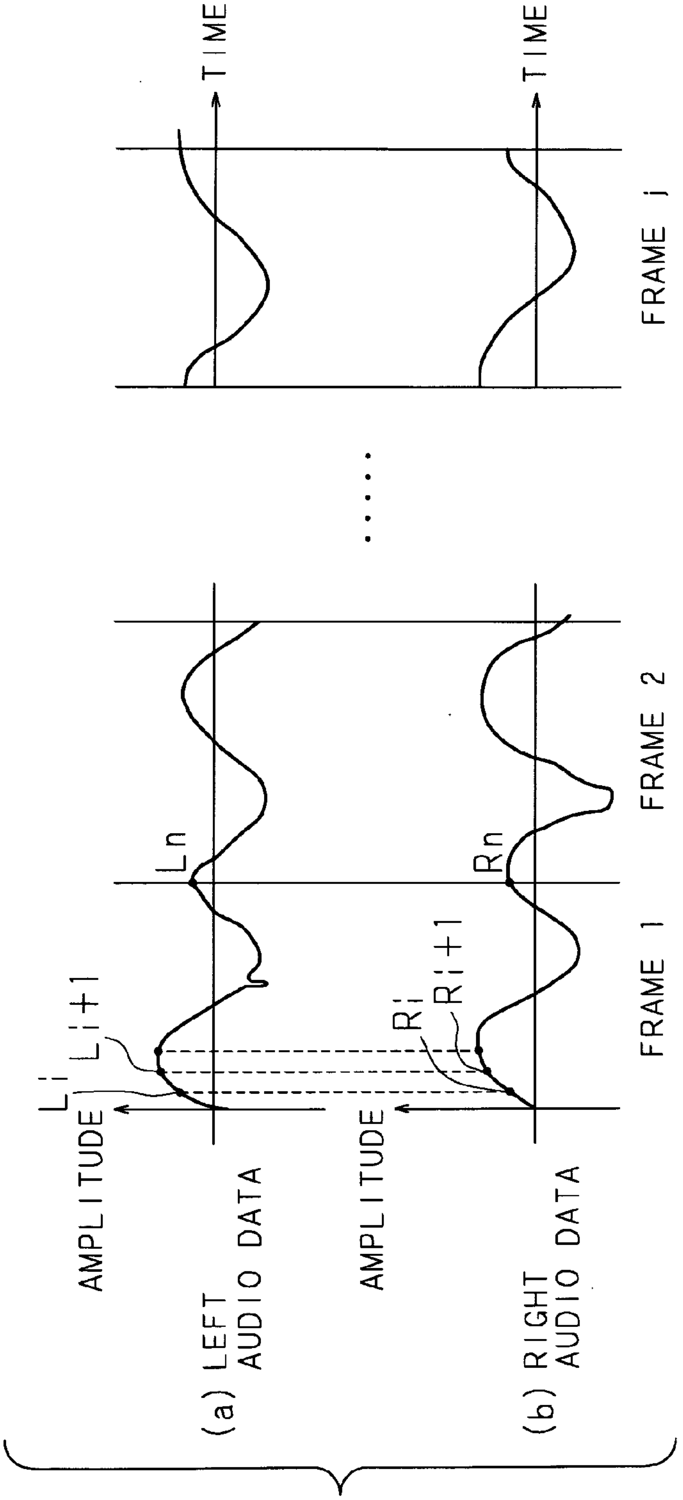
FIG. 4 is a graph schematically showing a temporal change in left audio data and right audio data.

FIG. 4 is a graph schematically showing a temporal change in left audio data and right audio data. FIG. 4 (*a*) is the graph schematically showing the temporal change in amplitude of the left audio data, while FIG. 4 (*b*) is the graph schematically showing the temporal change in amplitude of the right audio data. A horizontal axis and a vertical axis indicate time and amplitude in both graphs, respectively. The audio data to be inputted is divided into, for example, integral multiples of 33.3 milliseconds which is a time of one frame of NTSC (National Television Standards Committee) video, or integral multiples of 42.6 milliseconds which is a coding time of one frame of AAC for every predetermined time. Hereinafter, one unit of this predetermined time is referred to as frame. The audio data is divided into frame 1, frame 2, . . . frame j, and the added data and the subtracted data are calculated for every frame in the example shown in FIG. 4.

The left audio data can be expressed as Li, Li+1, . . . , Ln in the order of the time series according to a sampling frequency in the frame 1. Similarly, the right audio data in the frame 1 can be expressed as Ri, Ri+1, . . . , Rn in the order of the time series. The adding unit 141 adds the data of the left audio data in the specific time to the data of the right audio data in the specific time to calculate the sum signal. The sum signal of Ri and Li is calculated, for example. Next, the adding unit 141 calculates a value about the sum signal by dividing the added value by 2. Namely, an average of the left audio data and the right audio data in the specific time is calculated. The adding unit 141 performs this processing with respect to all of the data during the time, which present in one frame. Namely, computing processing is performed to all of time-series combinations from i to n. The adding unit 141 then calculates a total sum of the averages of all the combinations of the left audio data and the right audio data which present in the frame. The adding unit 141 calculates the average of the total sum by dividing the total sum by the number of combinations of the left audio data and the right audio data in the frame. Specifically, added data SM (1) in the frame 1 can be expressed with Equation (2).

[Equation 2]

$$SM(1) = \frac{1}{n}\sum_{i=1}^{n}\frac{Li + Ri}{2} \tag{2}$$

As described above, the added data will be a value equal to the maximum amplitude of the audio data or less by using the average in the specific time and the average of total sum in the frame. Hence, it is possible to achieve a reduction in data amount. Note that, although the average of the sum of the right audio data and the left audio data is calculated for the added data in the present embodiment, the added value may be used without calculating the average. Namely, a value about the sum signal may be computed by replacing ½ in Equation (2) with 1. In this case, the calculation of the added value is performed to all the combinations of the left audio data and the right audio data which present in one frame. A total sum of this added value may be calculated to then calculate the average of the total sum. Furthermore, an example of calculating the average of the total sum will be finally described on the added data, but the total sum may be calculated as the added data without calculating the average. Namely, computation is performed by replacing 1/n in Equation (2) with 1. The adding unit 141 performs the same processing for all the frames from frame 1 to frame j to thereby calculate added data SM(1) to added data SM(j).

Subsequently, the subtracting unit 142 will be described. The subtracting unit 142 subtracts the data in the specific time of the right audio data from the data in the specific time of the left audio data to calculate a difference signal. The subtracting unit 142 may subtract the data in the specific time of the left audio data from the data in the specific time of the right audio data. Next, the subtracting unit 142 calculates a value about the difference signal by dividing the subtracted value by 2. Namely, the subtracting unit 142 calculates an average of the subtracted values in the specific time. The subtracting unit 142 performs the processing for all the combinations of the left audio data and the right audio data which present in one frame. The subtracting unit 142 calculates a total suml of these averages to further calculate an average of the total sum. Specifically, subtracted data SS(1) in the frame 1 can be expressed with Equation (3).

[Equation 3]

$$SS(1) = \frac{1}{n}\sum_{i=1}^{n}\frac{Li - Ri}{2} \tag{3}$$

The average of the subtracted values and the average of the total sum are not necessarily calculated on the subtracted data also in the subtracting unit 142 as well as in the adding unit 141. That is, although the average of the difference between the right audio data and the left audio data is calculated for the subtracted data in the present embodiment, the subtracted value may be used as the value about the difference signal without calculating the average. Namely, computation is performed by replacing ½ in Equation (3) with 1. In this case, the calculation of the subtracted value is performed to all the combinations of the left audio data and the right audio data which present in one frame. A total sum of this subtracted value may be calculated to then calculate the average of the total sum. Furthermore, an example of calculating the average of the total sum will be finally described on the subtracted data, but the total sum may be calculated as the subtracted data without calculating the average. Namely, computation is performed by replacing 1/n in Equation (3) with 1. Further, effective values of Li+Ri in Equation (2) and Li−Ri of Equation (3) may be calculated, respectively. The subtracting unit 142 performs the same processing for all the frames from frame 1 to frame j to thereby calculate subtracted data SS(1) to subtracted data SS(j). The adding unit 141 and the subtracting unit 142 output the groups of the added data and the subtracted data whose frames have been all computed based on Equation (2) and Equation (3) stored in advance, to the metadata addition unit 15 as metadata.

FIG. 5 is a table showing a record layout in a metadata holding unit 13. The metadata holding unit 13 stores the metadata and the specific data which are calculated by the metadata calculators 1, 1, . . . at the preceding stage and outputted from the demultiplexer 11. The metadata holding unit 13 is configured to include a station ID field, a device ID field, and a metadata field. The station ID is unique identifier assigned to the key station and the relay station in advance. The smaller a numerical value of the station ID is, the more preceding stage the station is present therein. It means that, in this example, a station ID01 is the key station, and the relay station of a station ID02 is present at the subsequent stage, the relay station of a station ID03 at further subsequent stage, and the relay station of a station ID04 at still further subsequent stage.

The station ID of the relay station in this example will be 05 at still further subsequent stage than that described above. The device IDs are unique identifiers assigned in advance for specifying the metadata calculators 1 provided in the key station and the relay stations, respectively. An MAC (Media Access Control) address or the like may be used as these device IDs. Incidentally, although a form in which both of the station ID and the device ID are provided, will be described in the present embodiment, either of them may be used. As also for the device IDs, information that which device ID is a device ID of the metadata calculator 1 at the preceding stage is stored in a memory which is not shown. The metadata calculated by the specific metadata calculator 1 is associated with the station ID and the device ID for specifying the metadata calculator 1 and the metadata. Hereinafter, the station ID and the device ID for specifying the calculated metadata are referred to as specific data.

The metadata calculated by the metadata calculator 1 at the preceding stage is stored in the metadata field. The metadata holding unit 13 stores the metadata calculated by the metadata calculators 1, 1 . . . and the specific data for specifying the metadata as a history. The metadata holding unit 13 outputs the metadata and the specific data to the metadata addition unit 15 serving as an identification information addition unit. Note herein that, when the metadata calculator 1 shown in FIG. 2 is present in the key station, the preceding stage is not present, thus no data is stored in the metadata holding unit 13.

The metadata addition unit 15 which functions as the identification information addition unit adds the specific data of the station ID (05 in this example) and the device ID to the metadata outputted from the metadata calculating unit 14. The metadata addition unit 15 further performs processing of adding the metadata and the specific data to the metadata and the specific data of the preceding stage outputted from the metadata holding unit 13.

Figure 6:
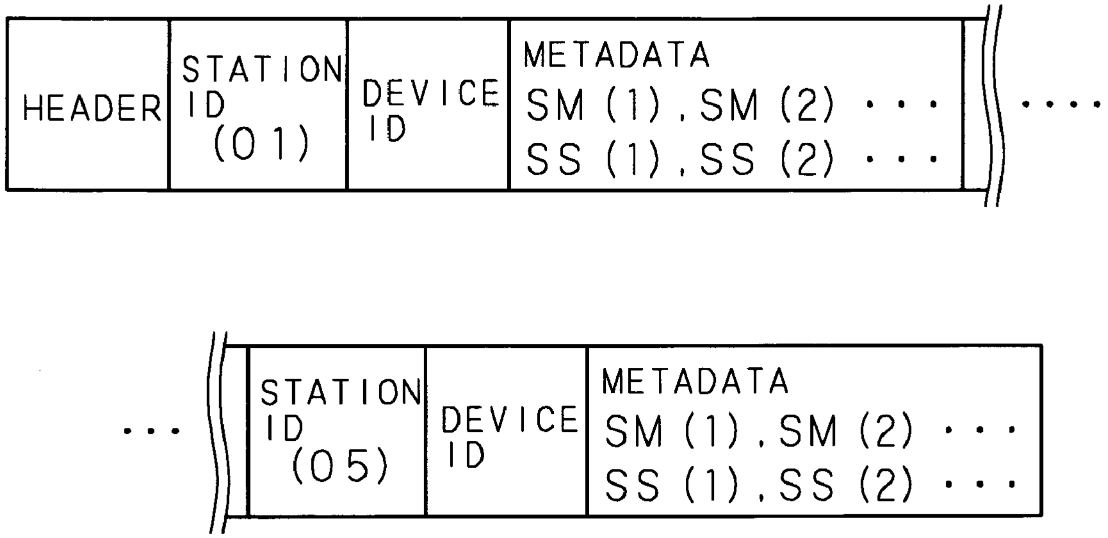
FIG. 6 is an explanatory view showing a data structure of metadata and specific data.

FIG. 6 is an explanatory view showing a data structure of the metadata and the specific data. The metadata and the specific data calculated by each metadata calculator 1 are combined with a header in the order of transmission as shown in FIG. 6. Namely, each metadata is combined therewith in ascending order of station ID. The metadata calculated by the metadata calculator 1 of the key station is stored in the most preceding stage along with the specific data of the station ID01. Additionally, the metadata calculated by the present metadata calculator 1 is stored in the last stage along with the specific data of the station ID05. The metadata and the specific data to which the history of the preceding stage is added by the metadata addition unit 15 are outputted to the addition unit 17.

The addition unit 17 adds the metadata and the specific data outputted from the metadata addition unit 15 to the audio data outputted from the demultiplexer 11 to then output them to the transmission unit 18. The transmission unit 18 transmits the audio data encoded by an encoder which is not shown in the drawing, and the metadata and the specific data added thereto along with the image data, to the metadata calculator 1 provided in the relay station at the subsequent stage. As a result, the metadata and the specific data calculated by each metadata calculator 1 will be added to the audio data one after another. Meanwhile, the amount of information assigned to the added data of each frame which constitutes the metadata may be the same amount of information assigned to the subtracted data of each frame, or may a value larger than the amount of information assigned to the subtracted data. Namely, the maximum absolute value of the subtracted data of each frame is smaller than that of the added data of each frame. From the fact described above, the amount of information assigned to the subtracted data of each frame may be equal to the amount of information assigned to the added data of each frame or less. For example, the amount of information assigned to the added data of each frame may be set to 12 bits, while the amount of information assigned to the subtracted data of each frame may be set to 8 bits. Thus, the amount of information to be assigned to the subtracted data can be reduced at the place where the amount of information of the metadata is limited, allowing high communication efficiency to be achieved.

Figure 7A:
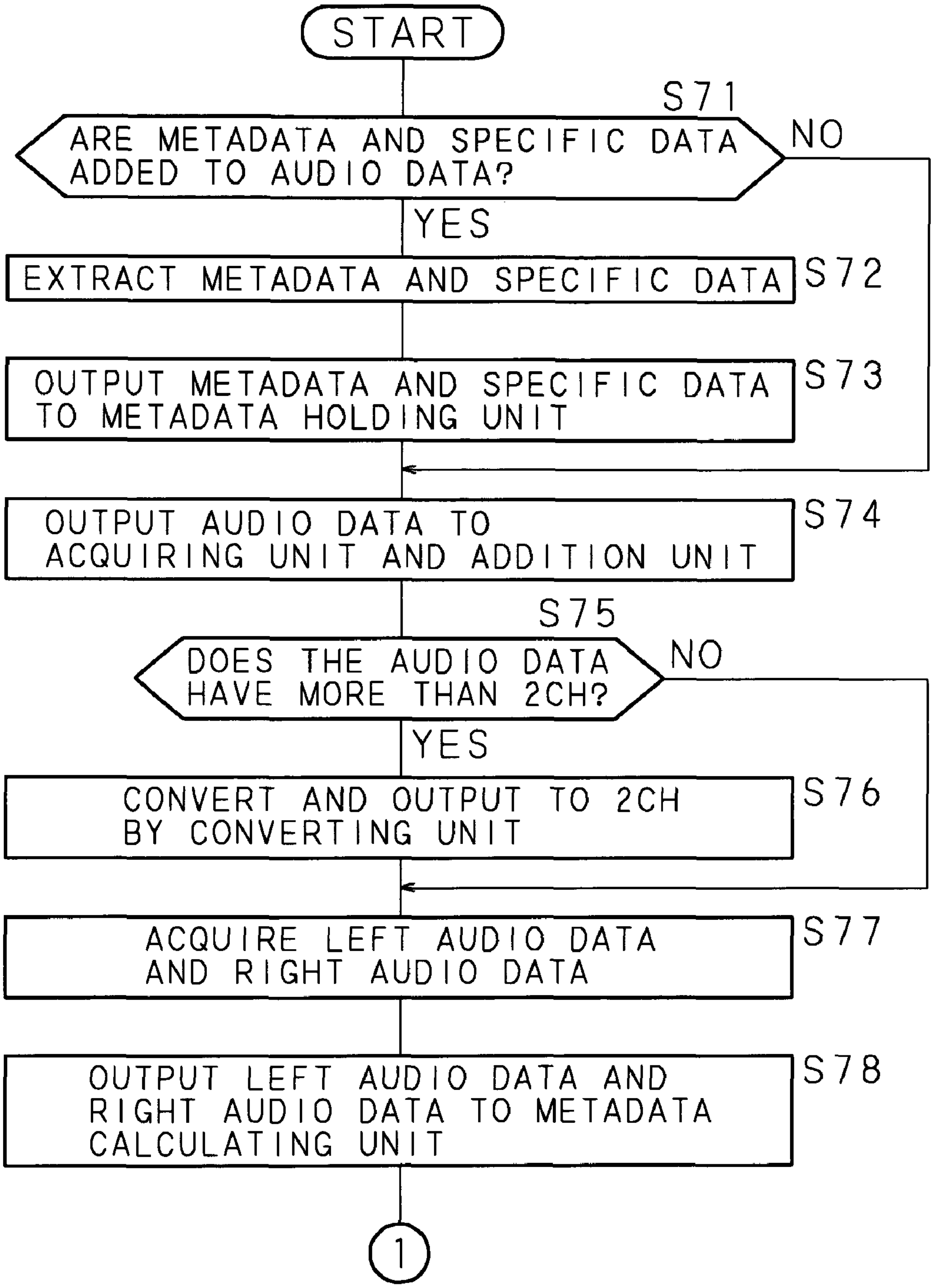
FIGS. 7A and 7B are flow charts showing procedures of metadata calculating processing and adding processing.
Figure 7B:
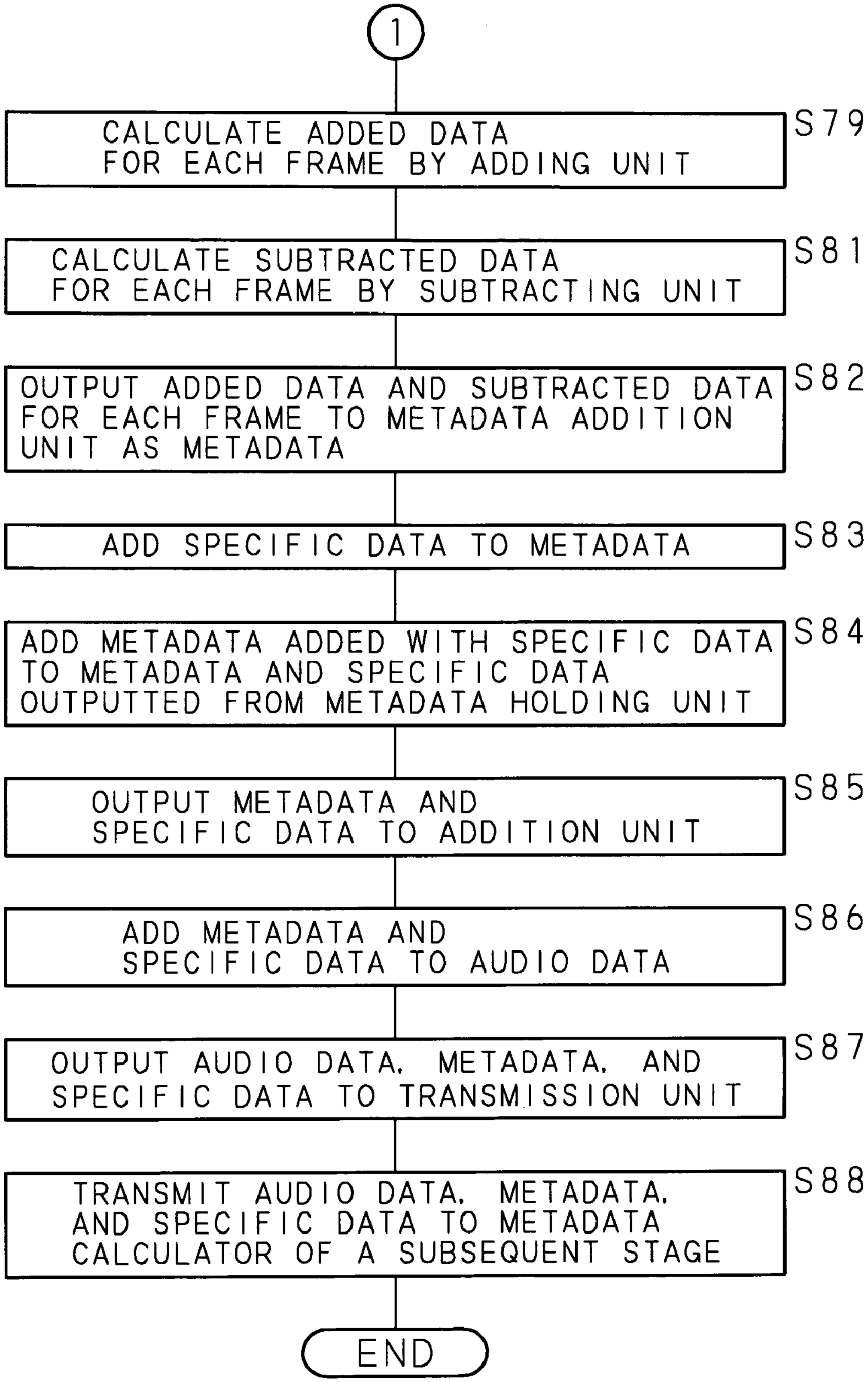

In the above hardware configuration, procedures of the metadata calculating processing and the adding processing will be described using flow charts. FIGS. 7A and 7B are flow charts showing the procedures of the metadata calculating processing and the adding processing. The demultiplexer 11 determines whether or not the metadata and the specific data are added to the inputted audio data (step S71). The demultiplexer 11 extracts the metadata and the specific data from the audio data (step S72) if it determines that the metadata and the specific data are added to the inputted audio data (YES at step S71).

The demultiplexer 11 outputs the metadata and the specific data to the metadata holding unit 13 (step S73). If the demultiplexer 11 determines that the metadata and the specific data are not added to the audio data at step S71 (NO at step S71), the processing at steps S72 and S73 is skipped. Additionally, the demultiplexer 11 outputs the audio data to which the metadata and the specific data are not added to the acquiring unit 12 and the addition unit 17 (step S74). The acquiring unit 12 determines whether or not the audio data has the number of channels more than 2ch (step S75).

If the acquiring unit 12 determines that the audio data has the number of channels more than 2ch (YES at step S75), the converting unit 121 reads Equation (1) to convert the audio data into the audio data of 2ch by substituting a numerical value, and outputs the audio data of 2ch via the output unit 122 (step S76). The acquiring unit 12 proceeds to step S77 after the processing at step S76. Meanwhile, if the acquiring unit 12 determines that the audio data has not the number of channels more than 2ch at step S75 (NO at step S75), namely, if it determines that the audio data is the signal of 2ch, it skips the processing at step S76, and acquires the left audio data and the right audio data (step S77).

The acquiring unit 12 outputs the left audio data and the right audio data to the metadata calculating unit 14 (step S78). The adding unit 141 reads Equation (2) to calculate the added data of each frame by substituting the left audio data and the right audio data to Equation (2) (step S79). The subtracting unit 142 reads Equation (3) to calculate the subtracted data of each frame by substituting the left audio data and the right audio data to Equation (3) (step S81).

The metadata calculating unit 14 outputs the added data of each frame calculated by the adding unit 141 and the subtracted data of each frame calculated by the subtracting unit 142 to the metadata addition unit 15 as metadata (step S82). The metadata addition unit 15 reads the station ID and the device ID of the metadata calculator 1 stored in the memory which is not shown to add them to the metadata outputted from the metadata calculating unit 14 (step S83). The metadata addition unit 15 adds the metadata and the specific data of the metadata calculator 1 at the preceding stage outputted from the metadata holding unit 13, to the metadata to which the specific data is added at step S83 (step S84). The metadata addition unit 15 sorts each metadata and specific data in ascending order of numerical values of the station ID or the device ID so that the station ID or the device ID at the preceding stage may be in a higher rank, and generates the groups' of the metadata and the specific data shown in FIG. 6.

The metadata addition unit 15 outputs the metadata and the specific data to the addition unit 17 (step S85). The addition unit 17 adds the metadata and the specific data outputted from the metadata addition unit 15 to the audio data outputted from the demultiplexer 11 (step S86). The addition unit 17 outputs the encoded audio data, metadata, and specific data along with the image data to the transmission unit 18 (step S87). The transmission unit 18 transmits the image data, the audio data, the metadata, and the specific data to the metadata calculator 1 at the subsequent stage (step S88).

Second Embodiment

Figure 8:
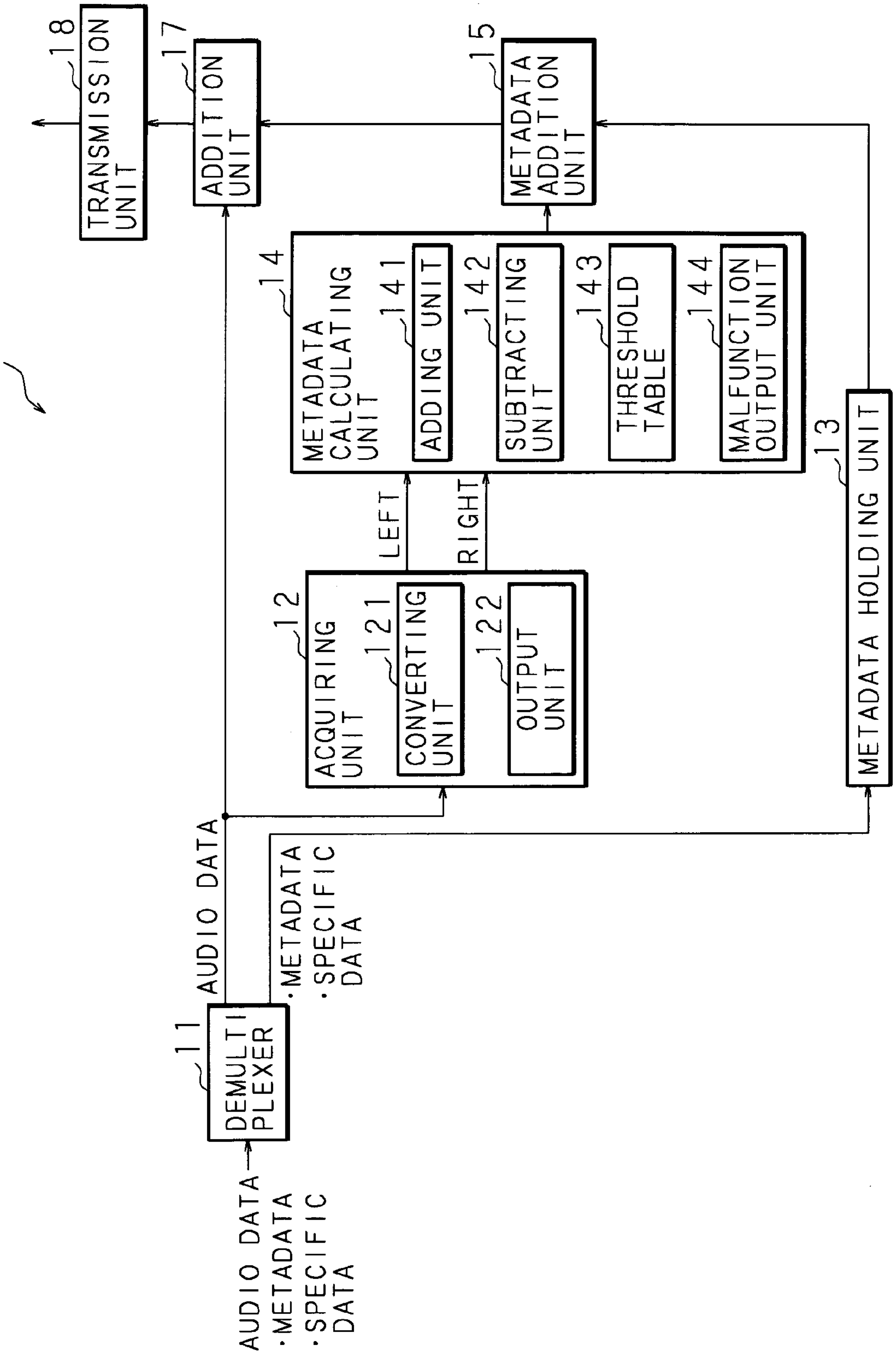
FIG. 8 is a block diagram showing a hardware configuration of a metadata calculator according to a second embodiment.

A second embodiment relates to an embodiment in which signals for indicating malfunctions are outputted based on the calculated metadata. FIG. 8 is a block diagram showing a hardware configuration of the metadata calculator 1 according to the second embodiment. The metadata calculating unit 14 according to the second embodiment is configured to further include a threshold table 143 and a malfunction output unit 144 in addition to the configuration of the first embodiment. The metadata calculating unit 14 outputs the signals for indicating the malfunctions from the malfunction output unit 144 when the metadata based on the added data calculated by the adding unit 141 or the subtracted data calculated by the subtracting unit 142 exceeds a threshold stored in the threshold table 143.

The malfunction output unit 144 may be a device that outputs the signals for indicating the malfunctions, for example, an LED (Light Emitting Diode) lamp, a display, a loudspeaker, a wireless LAN (Local Area Network) card, or the like may be used. When the metadata exceeds the threshold, the LED lamp lights up, and a text for indicating the malfunctions is read and displayed, or an audio guidance for indicating the malfunctions is outputted to the loudspeaker. Meanwhile, when the malfunction output unit 144 is the wireless LAN card, the signals for indicating the malfunctions by HTTP (Hyper Text Transfer Protocol) via the Internet are transmitted to a management server computer which is not shown in the drawing along with the station ID, the device ID, and the metadata.

FIG. 9 is an explanatory view showing a record layout of the threshold table 143. A threshold X is stored in association with the added data, and a threshold Y is also stored in association with the subtracted data. Furthermore, a threshold x to the added data and a threshold y to the subtracted data are stored in association with both of the added data and the subtracted data, respectively. Incidentally, x is smaller than X and y is smaller than Y. A value of each threshold can be set appropriately by an operator from an input unit which is not shown in the drawing.

The metadata calculating unit 14 outputs the signals for indicating the malfunctions via the malfunction output unit 144 if the added data calculated by the adding unit 141 would exceed the threshold X corresponding to the added data stored in the threshold table 143. Thereby, an in-phase noise is detected. The metadata calculating unit 14 outputs the signals for indicating the malfunctions via the malfunction output unit 144 if the subtracted data calculated by the subtracting unit 142 would exceed the threshold Y corresponding to the subtracted data stored in the threshold table 143. Thereby, a reverse-phase noise is detected.

Further, the metadata calculating unit 14 outputs the signals for indicating the malfunctions via the malfunction output unit 144 if the added data calculated by the adding unit 141 would exceed the threshold x corresponding to both the added data and the subtracted data stored in the threshold table 143, and the subtracted data calculated by the subtracting unit 142 would exceed the threshold y corresponding to both the added data and the subtracted data stored in the threshold table 143. The aforementioned processing is performed to the metadata of each frame. As described above, various noises can be effectively detected by determining based on both the added data and the subtracted data whether or not malfunctions are present. Note herein that, the threshold in consideration of both the added data and the subtracted data as described above is set to a value lower than that of the threshold when it is determined only by either of the added data and the subtracted data.

The present second embodiment is configured as described above, and since other configurations and functions are the same as those of the first embodiment, the same reference number is given to a corresponding part, and thus the detailed explanation will be omitted.

Third Embodiment

Figure 10:
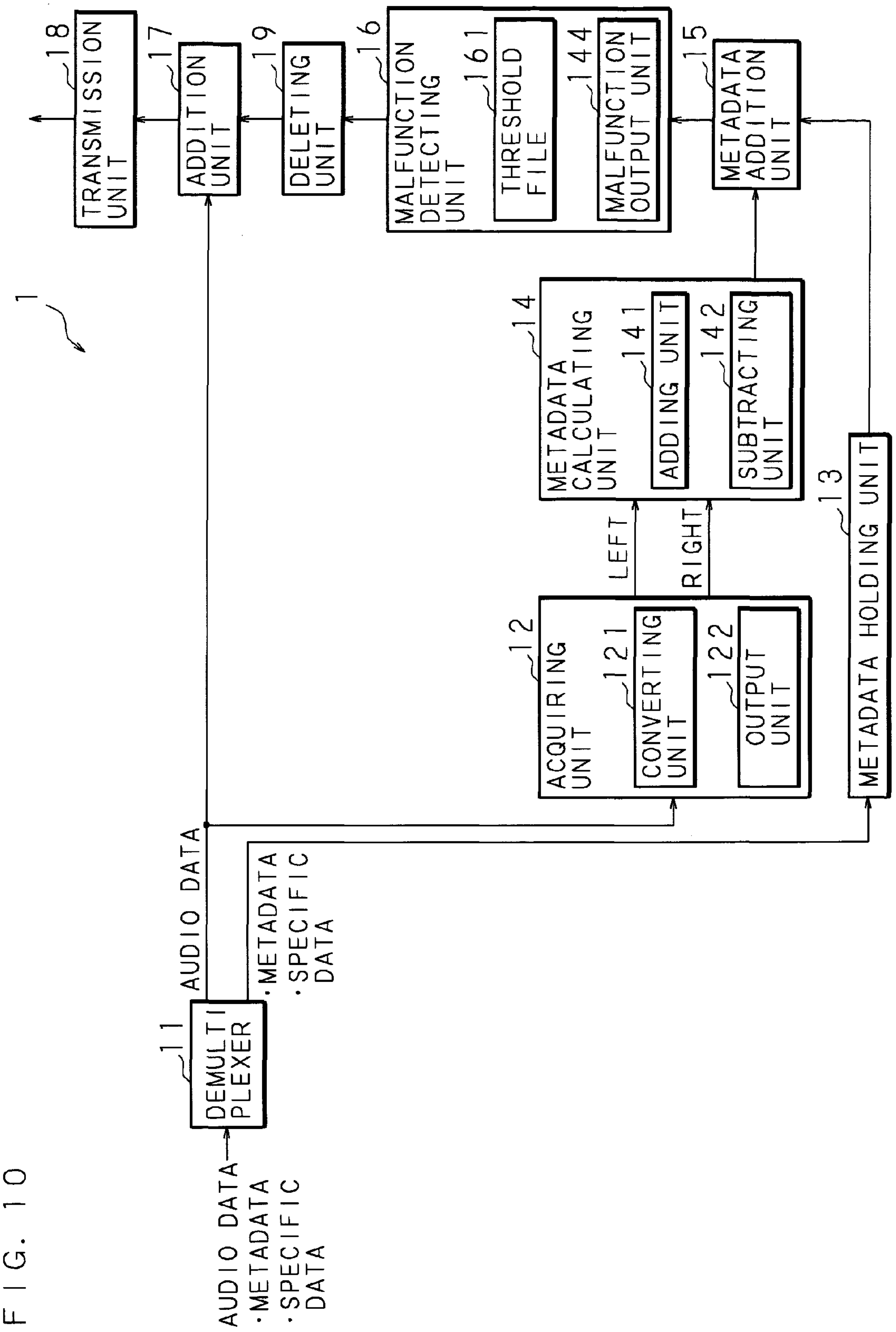
FIG. 10 is a block diagram showing a hardware configuration of a metadata calculator according to a third embodiment.

A third embodiment relates to an embodiment in which the malfunctions are detected by comparing the metadata added at the preceding stage with the metadata obtained by the calculation. FIG. 10 is a block diagram showing a hardware configuration of a metadata calculator 1 according to the third embodiment. There are provided a malfunction detecting unit 16 and a deleting unit 19 in addition to the configuration of the first embodiment. The malfunction detecting unit 16 is configured to include a threshold file 161 and the malfunction output unit 144 similar to that described in the second embodiment. The malfunction detecting unit 16 outputs the signals for indicating the malfunctions via the malfunction output unit 144 if the metadata of the specific frame calculated by the metadata calculating unit 14 of the present metadata calculator 1 is above or below a predetermined value, the data including the predetermined value, or has a rate of change above or below a predetermined value, the rate including the predetermined value, to the metadata of the specific frame of the preceding stage outputted from a metadata addition unit 15. An example in which the signals for indicating the malfunctions are outputted if an absolute value of a difference between the metadata of the specific frame of the preceding stage and the metadata of the specific frame calculated by the metadata calculating unit 14 exceeds a predetermined threshold will be described in the present embodiment.

FIG. 11 is an explanatory view showing a record layout in the threshold file 161. Each threshold is stored in the threshold file 161 in association with a type of the threshold. A first threshold of the added data is stored as X and a second threshold of the subtracted data is stored as Y. As for the first threshold and the second threshold, a value of 5% of the amount of information of the metadata may be stored, for example. Namely, a value of about 5% (3277) of 2 to the 16th power (65536) is stored when the amount of information of the metadata is 16 bits. The aforementioned threshold may be 1 when the same hardware or software is used in each key station and relay station.

A third threshold x of the added data and a fourth threshold y of the subtracted data are also stored in the threshold file 161 in addition to the first threshold X and the second threshold Y The third threshold x in consideration of both of the added data and the subtracted data is set to a value smaller than that of the first threshold X in consideration of only the added data. The fourth threshold y in consideration of both of the added data and the subtracted data is also set to a value smaller than that of the second threshold Y in consideration of only the subtracted data. For example, as for the third threshold x and the fourth threshold y, a value of 3% of the amount of information of the metadata may be stored. Meanwhile, the third threshold x and the fourth threshold y may be set to 1, respectively, when the same hardware or software is used in each key station and relay station, similar to the case of the first threshold and the second threshold. Incidentally, values of these thresholds can be appropriately changed by the input unit which is not shown in the drawing. The malfunction output unit 144 serves as described in the second embodiment, and externally outputs the signals for indicating the malfunctions when the absolute value of the difference between the metadata of the preceding stage and the metadata calculated by the metadata calculating unit 14 exceeds the threshold. Note herein that, although an example in which the absolute value of the difference with the metadata newly added by the metadata calculator 1 at one preceding stage of the present metadata calculator 1 is calculated will be described in the present embodiment, the embodiment is not limited thereto. For example, the absolute value of the difference with the metadata newly added by the metadata calculator 1 at two preceding stages may be calculated. The absolute value of the difference between the average of the metadata for a plurality of preceding stages (for example, for three preceding stages) and the metadata calculated by the present metadata calculator 1 may be calculated other than this. The malfunction detecting unit 16 outputs the metadata and the specific data outputted from the metadata addition unit 15 to the deleting unit 19 after performing the malfunction detection. Incidentally, details of the deleting unit 19 will be described later.

Figure 12A:
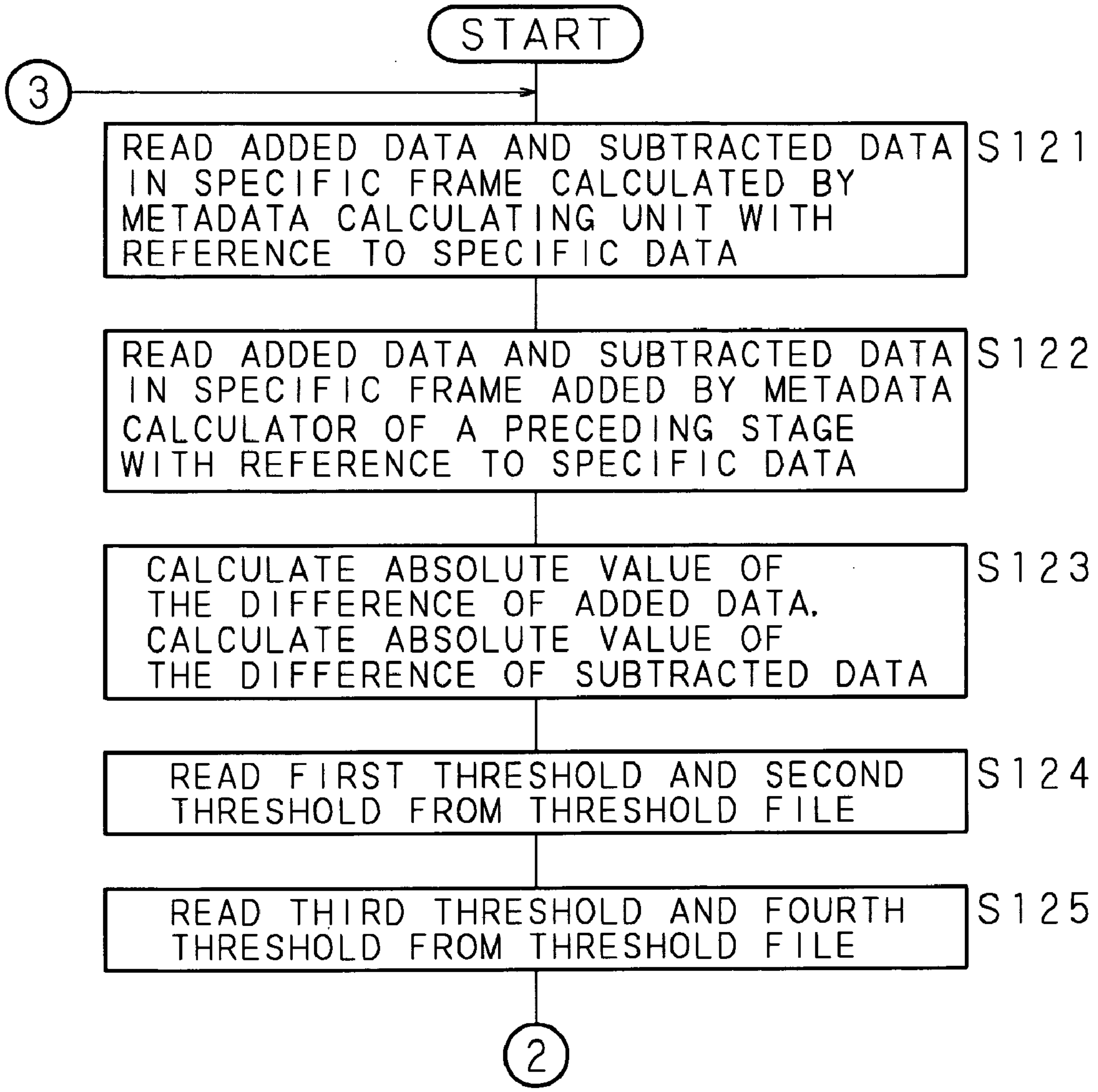
FIGS. 12A and 12B are flow charts showing procedures of malfunction detecting processing.
Figure 12B:
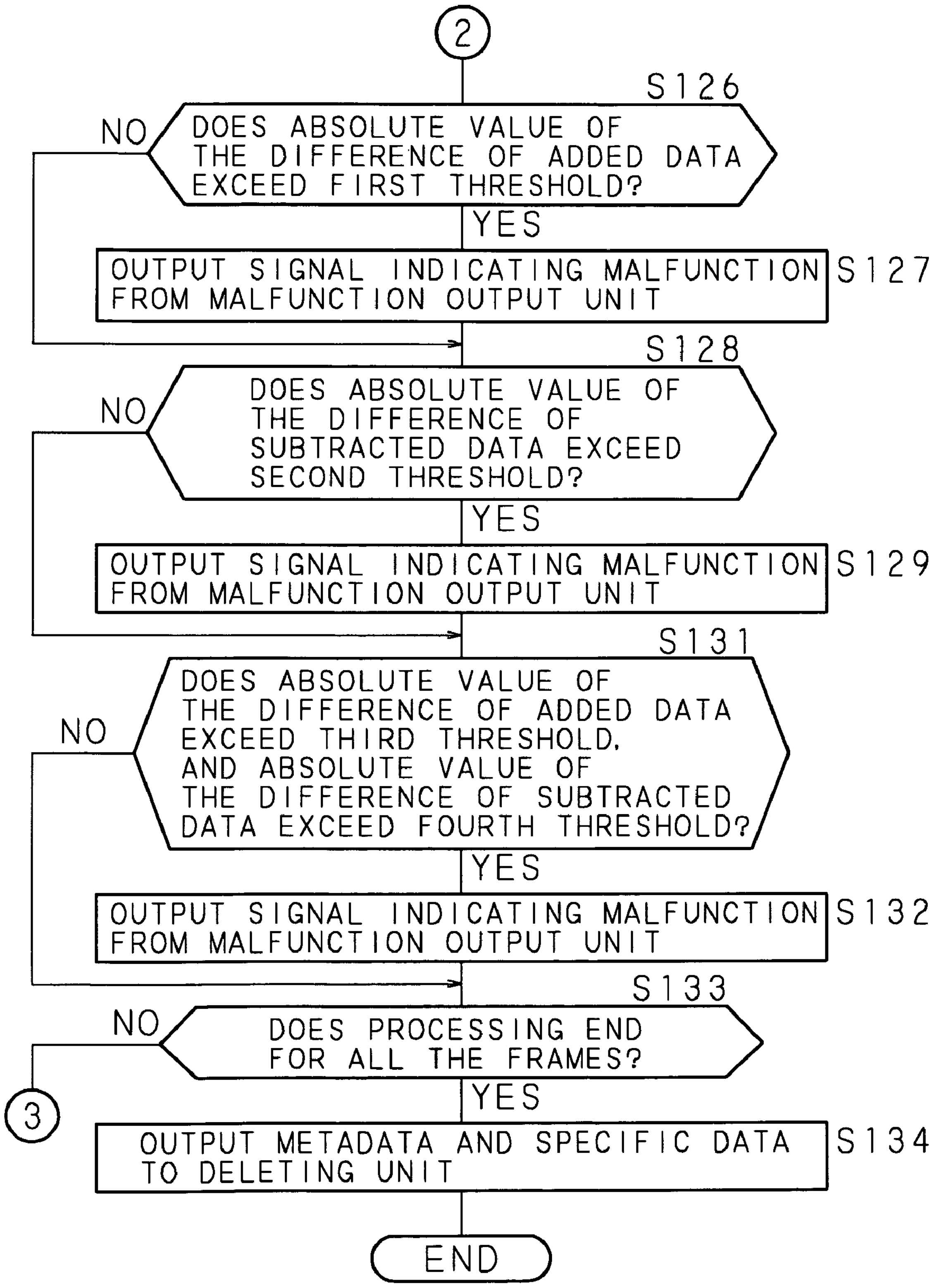

FIGS. 12A and 12B are flow charts showing the procedures of the malfunction detecting processing. The malfunction detecting unit 16 refers to the specific data among the metadata and the specific data outputted from the metadata addition unit 15 to read the added data and the subtracted data of the specific frame calculated by the metadata calculating unit 14 of the present metadata calculator 1 (step S121). Specifically, it refers to the station ID or the device ID to read the added data and the subtracted data. An initial frame of this specific frame is a first frame.

The malfunction detecting unit 16 refers to the specific data among the metadata and the specific data outputted from the metadata addition unit 15 to read the added data and the subtracted data of the specific frame added by the metadata calculator 1 at the preceding stage (step S122). Similarly, it refers to the station ID and the device ID to read the added data and the subtracted data at one preceding stage also in this processing. The malfunction detecting unit 16 calculates the absolute value of the difference between the added data read at step S121 and the added data read at step S122, and calculates the absolute value of the difference between the subtracted data read at step S121 and the subtracted data read at step S122 in a manner similar to that described above (step S123).

The malfunction detecting unit 16 reads the first threshold and the second threshold from the threshold file 161 (step S124). Furthermore, the malfunction detecting unit 16 reads the third threshold and the fourth threshold from the threshold file 161 (step S125). The malfunction detecting unit 16 determines whether or not the absolute value of the difference of the added data exceeds the first threshold of the added data (step S126). If the malfunction detecting unit 16 determines that the absolute value of the difference of added data exceeds the first threshold (YES at step S126), it outputs the signals for indicating the malfunctions from the malfunction output unit 144 (step S127). Incidentally, this signal may indicate that malfunctions are present in the added data itself.

Meanwhile, if the malfunction detecting unit 16 determines that the absolute value of the difference of the added data does not exceed the first threshold (NO at step S126), it skips the processing at step S127. The malfunction detecting unit 16 determines whether or not the absolute value of the difference of the subtracted data exceeds the second threshold (step S128). If the malfunction detecting unit 16 determines that the absolute value of the difference of subtracted data exceeds the second threshold (YES at step S128), it outputs the signals for indicating the malfunctions from the malfunction output unit 144 (step S129). Incidentally, this signal may indicate that malfunctions are present in the subtracted data itself.

Meanwhile, if the malfunction detecting unit 16 determines that the absolute value of the difference of the subtracted data does not exceed the second threshold (NO at step S128), it skips the processing at step S129. The malfunction detecting unit 16 determines whether or not the absolute value of the difference of the added data exceeds the third threshold and the absolute value of the difference of the subtracted data exceeds the fourth threshold (step S131). If the malfunction detecting unit 16 determines that the absolute value of the difference of the added data exceeds the third threshold and the absolute value of the difference of the subtracted data exceeds the fourth threshold (YES at step S131), it outputs the signals for indicating the malfunctions from the malfunction output unit 144 (step S132). Incidentally, this signal may indicate that malfunctions are present in both of the added data and the subtracted data.

Meanwhile, if the malfunction detecting unit 16 does not determine that the absolute value of the difference of the added data exceeds the third threshold and the absolute value of the difference of the subtracted data exceeds the fourth threshold (NO at step S131), it skips the processing at step S132. The malfunction detecting unit 16 set a processed flag in association with a frame number after finishing the processing at step S126, S128, and S131. The malfunction detecting unit 16 determines whether or not the processing for all the frames is completed (step S133). Specifically, it determines whether or not the flags to the last frame number j are set.

If the malfunction detecting unit 16 determines that the processing of all the frames has not been completed (NO at step S133), it increments the frame number to then proceed to step S121 so as to perform the same processing for the following frame. Meanwhile, if the malfunction detecting unit 16 determines that the processing for all the frames is completed (YES at step S133), the metadata and the specific data are outputted to the deleting unit 19 (step S134).

The deleting unit 19 will be then described. The deleting unit 19 may perform the processing to delete the predetermined metadata and specific data when the metadata and the specific data are present more than the predetermined amount. The deleted metadata and specific data are outputted to the addition unit 17. Specifically, the metadata added in the key station and the added data, and the newest metadata calculated by the metadata calculating unit 14 of the present metadata calculator 1 and the specific data of this metadata are at least stored without being deleted. The other metadata and specific data are deleted according to the predetermined conditions in order to reduce channel capacity.

Figure 13:
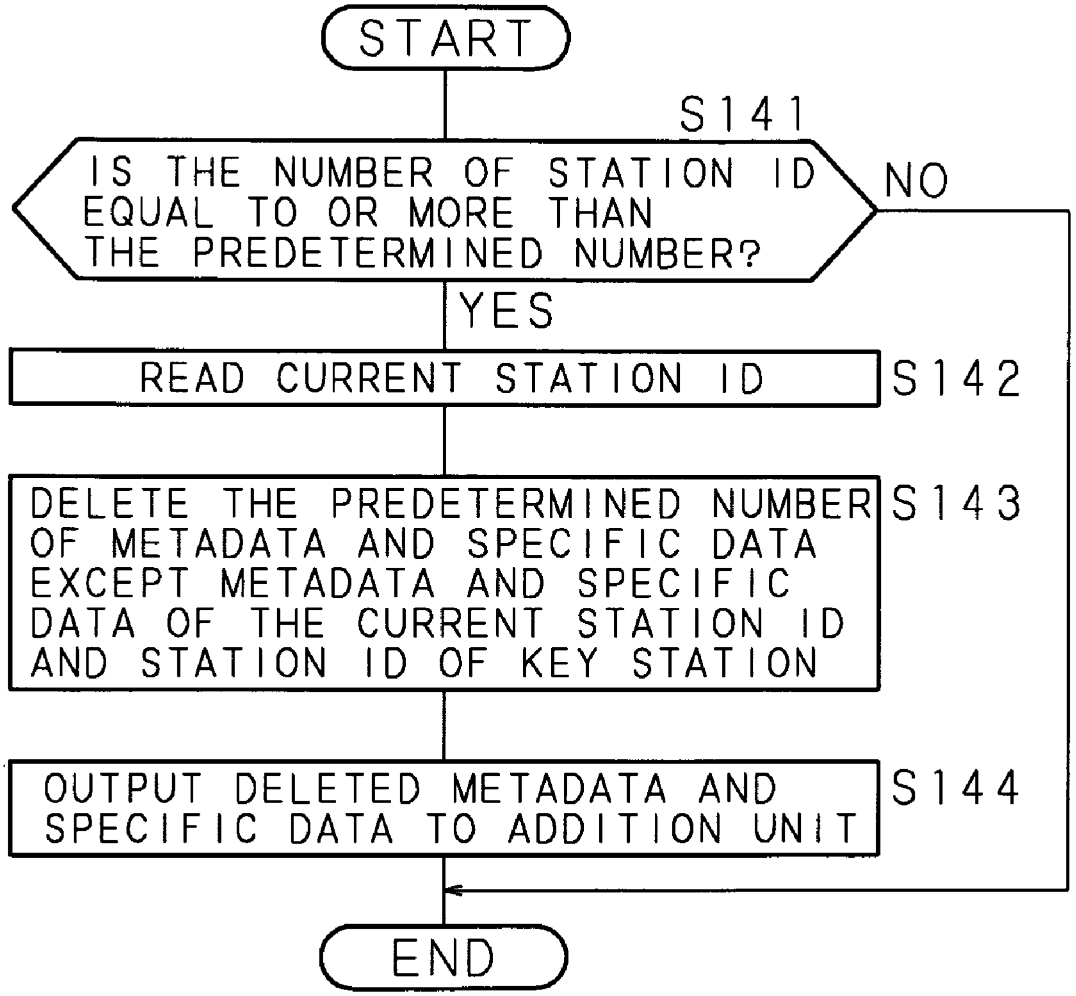
FIG. 13 is a flow chart showing procedures of deleting processing.

FIG. 13 is a flow chart showing the procedures of the deleting processing. The deleting unit 19 refers to the specific data of the metadata to determine whether or not the number of station IDs is equal to a predetermined number or more (step S141). This means, for example, that whether or not it is equal to five or more may be determined. If the deleting unit 19 determines that the number of station IDs is less than the predetermined number (NO at step S141), it completes the processing since there is no need for deletion. Meanwhile, if the deleting unit 19 determines that the number of station IDs is equal to the predetermined number or more (YES at step S141), it reads a current station ID (step S142). That is, it reads the station ID of the metadata calculator 1 that is currently performing the processing (step S142). Although an example using the station ID will be described in the present embodiment, the device ID may be used for it.

The deleting unit 19 deletes the predetermined number of metadata and specific data except for the metadata and the specific data of the current station ID and the station ID of the key station (step S143). Namely, the deleting processing is performed except for the metadata and the specific data of the first and the last station IDs. The metadata and the specific data of the station ID extracted at random may be deleted in this deleting processing, for example. The metadata and the specific data of the other station IDs except for the first and the last station IDs, and the station IDs back to the predetermined number from the last station ID may be deleted other than that. That is, old information, namely, the metadata and the specific data of the predetermined number of station IDs on an upstream side may be preferentially deleted except for the metadata and the specific data of the first station ID. The deleting unit 19 outputs the metadata and specific data after deletion, the data amount of which being reduced, to the addition unit 17 (step S144). As a result, the metadata of the audio data can be transmitted without causing the communication speed to be decreased.

The third embodiment is configured as described above, and since other configurations and functions are the same as those of the first and the second embodiments, the same reference number is given to a corresponding part, and thus the detailed explanation will be omitted.

Fourth Embodiment

Figure 14:
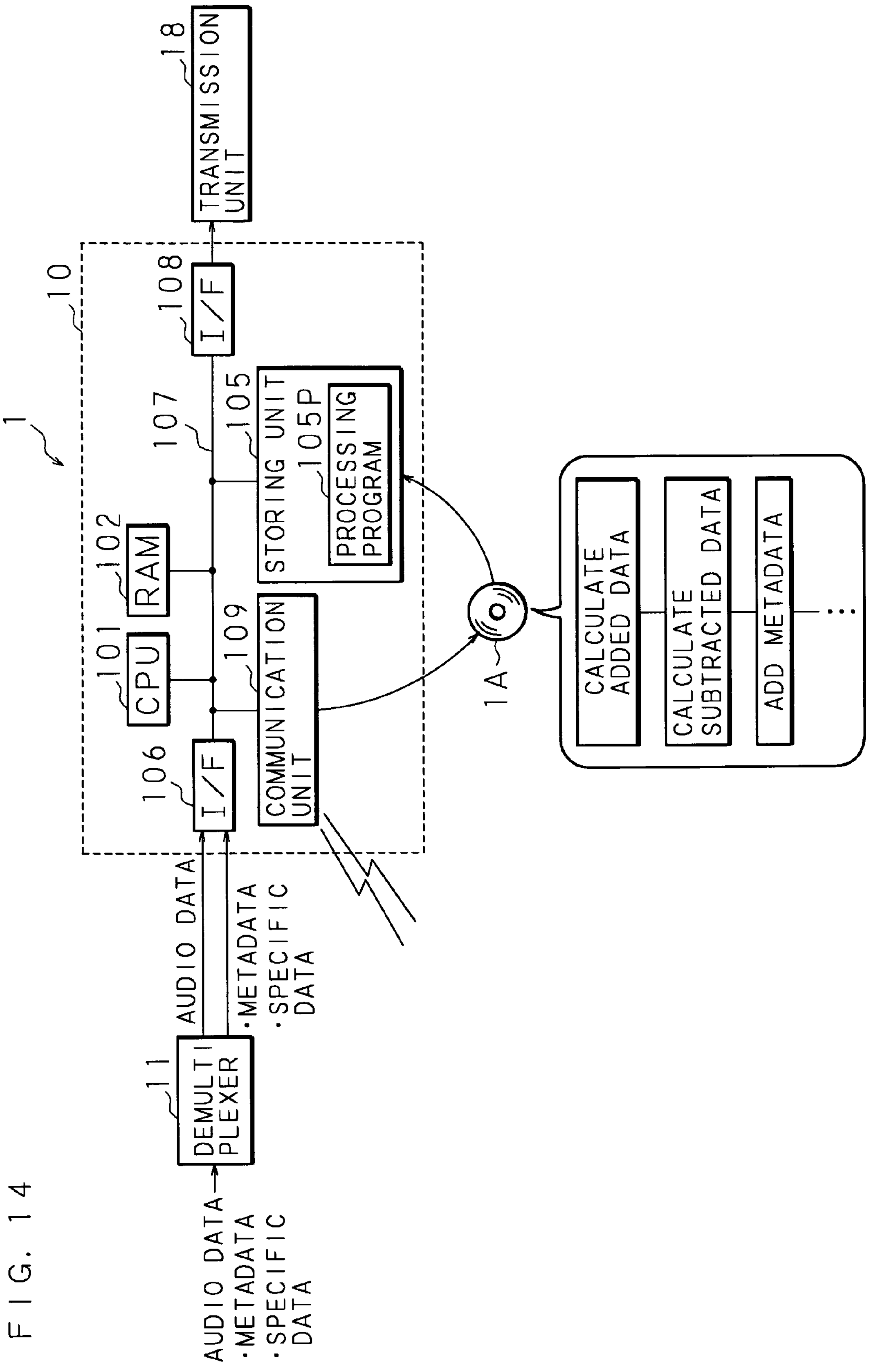
FIG. 14 is a block diagram showing a hardware configuration of a metadata calculator according to a fourth embodiment.

The processing according to the first to the third embodiments may be achieved using a computer shown in FIG. 14 as software processing. FIG. 14 is a block diagram showing a hardware configuration of a metadata calculator 1 according to a fourth embodiment. A computer 10 is configured to include a CPU (Central Processing Unit) 101, a RAM (Random Access Memory) 102, a storing unit 105 such as a hard disk, I/Fs 106 and 108 which are interfaces, a communication unit 109, and the like. The CPU 101 is connected to each hardware device via a bus 107 to execute the aforementioned various kinds of software processing according to a processing program 105P stored in the storing unit 105.

The program for operating the computer 10 can also be provided by a portable recording medium 1A, such as CD-ROM, MO, DVD-ROM, or the like. The program can also be downloaded from a server computer which is not shown in the drawing via the communication unit 109, such as a wireless LAN card. Hereinafter, contents thereof will be described.

The portable recording medium 1A (CD-ROM, MO, DVD-ROM, or the like) in which a program for calculating the added data, calculating the subtracted data, adding the metadata, and the like is recorded is inserted in a reader/writer which is not shown in the drawing of the computer 10 shown in FIG. 14 to thereby install this program in the processing program 105P of the storing unit 105 Alternatively, this program may be downloaded from an outside server computer which is not shown in the drawing via the communication unit 109 to thereby install it in the storing unit 105. This program is loaded to the RAM 102 to be executed. As a result, the audio data, the metadata, and the specific data are inputted therein from the demultiplexer 11 via the I/F 106 to execute the processing described in the first to the third embodiments. The audio data to which the processed metadata and specific data are added is outputted to the transmission unit 18 via the I/F 108.

The fourth embodiment is configured as described above, and since other configurations and functions are the same as those of the first to the third embodiments, the same reference number is given to a corresponding part, and thus the detailed explanation will be omitted.

Subsequently, experimental results using the metadata calculator 1 described in the first embodiment will be described. Both of music data using a sine wave (hereinafter referred to as a first music data) and music data using a contrabass (hereinafter referred to as a second music data) are utilized in the experiment. The first music data has used a track 1 of SQAM ((Sound Quality Assessment Material and), the sound source for subjectivity evaluation according to CCIR (International Telecommunication Advisory Committee) specification 562) produced by European Broadcasting Union, while the second music data has used a track 11.

Figure 15:
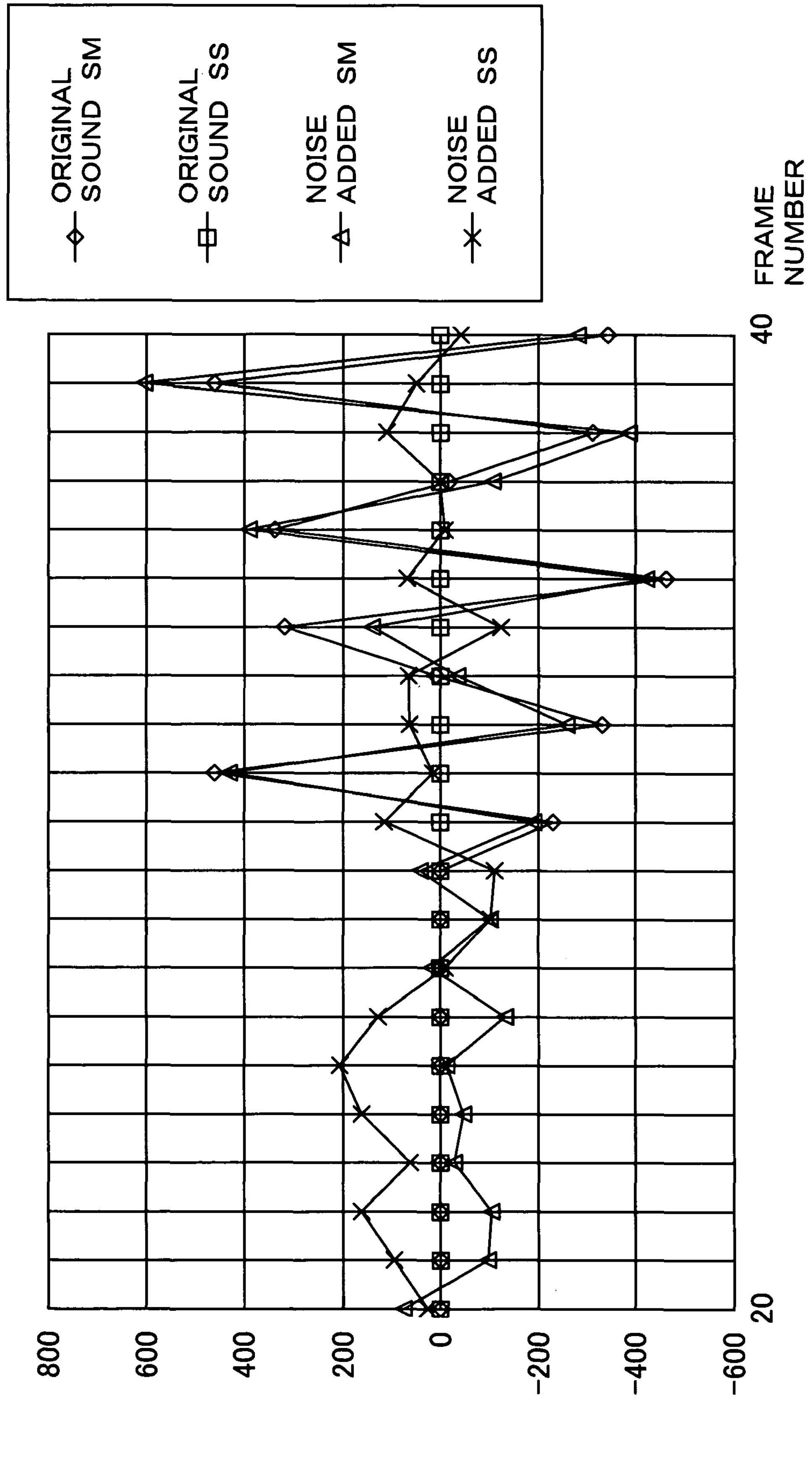
FIG. 15 is a graph showing a change in the added data and the subtracted data for every frame when a first music data is used.

FIG. 15 is a graph showing a change in the added data and the subtracted data for every frame when the first music data is used. A horizontal axis indicates the frame numbers and one frame is about 33 milliseconds. A vertical axis indicates a value of the added data of each frame (hereinafter referred to as SM data in some cases) or the subtracted data of each frame (hereinafter referred to as SS data in some cases) obtained by Equation (2) or Equation (3), wherein a decimal point is provided in a position of 20 bits to extract only the integer. A line indicated with diamonds is a graph that shows a change in SM data to the frames when the left audio data and the right audio data of an original sound are substituted in Equation (2). Although there are 3056 frame numbers in total, frame number 20 to frame number 40 are shown in the graph. A line indicated with squares is a graph that shows a change in SS data to the frames when the left audio data and the right audio data of the original sound are substituted in Equation (3).

A random noise is added to leading two samples of the frames in the original sound in this experiment. A line indicated with triangles is a graph that shows a change in SM data to the frames when the left audio data and the right audio data in which the random noise is added to the original sound are substituted in Equation (2). Additionally, a line indicated with X marks is a graph that shows a change in SS data to the frames when the left audio data and the right audio data in which the random noise is added to the original sound are substituted in Equation (3). Here, when the original sound SM data indicated with diamonds and the SM data indicated with triangles in which the random noise is added are matched with each other, and the original sound SS data indicated with squares and the SS data indicated with X marks in which the random noise is added are matched with each other, the added random noise cannot be detected. However, the random noise added without satisfying these conditions could be detected in all the frames of 3056.

Moreover, the maximum absolute value of the SM data indicated with triangles is larger than that of the SS data indicated with X marks as shown in FIG. 15. Among 3056 frames, the maximum absolute value of the SM data is 4568 and the maximum absolute value of the SS data is 308. Hence, in this example, 14 bits including sign bits may be assigned as an amount of information of the SM data, and 10 bits including sign bits may be assigned as an amount of information of the SS data smaller than that.

Figure 16:
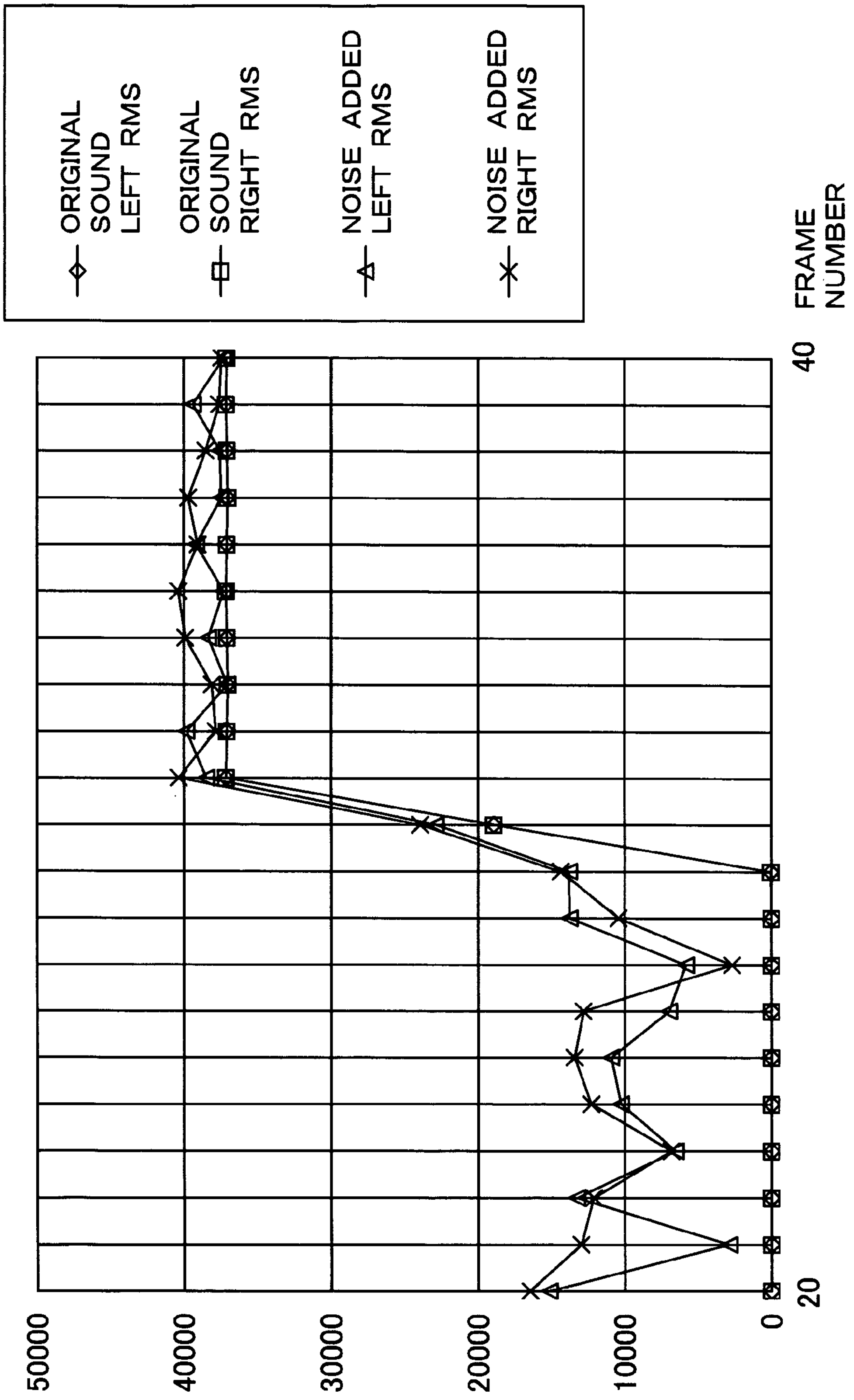
FIG. 16 is a graph showing a change in effective values of the left audio data and the right audio data for every frame when the first music data is used.

Experiments using an effective value (RMSV: Root Mean Square Value) of the left audio data and the right audio data have also conducted in order to compare with the experimental results by the metadata calculator 1 according to the present embodiment. FIG. 16 is a graph showing a change in effective values of the left audio data and the right audio data for every frame when the first music data is used. A horizontal axis indicates frames and a vertical axis indicates effective values. A line indicated with diamonds is a graph that shows a change in the effective value of the left audio data (hereinafter referred to as LRMS) of the original sound to the frames. LRMS (1) of the first frame of the left audio data can be expressed with Equation (4).

[Equation 4]

$$LRMS(1) = \sqrt{\frac{1}{n}\sum_{i=1}^{n}(Li)^2} \quad (4)$$

Meanwhile, a line indicated with squares is a graph that shows a change in the effective value of the right audio data (hereinafter referred to as RRMS) of the original sound to the frames. RRMS (1) of the first frame of the right audio data can be expressed with Equation (5).

[Equation 5]

$$RRMS(1) = \sqrt{\frac{1}{n}\sum_{i=1}^{n}(Ri)^2} \quad (5)$$

A line indicated with triangles is LRMS of the left audio data in which similar random noise is added to the original sound. Meanwhile, a line indicated with X marks is RRMS of the right audio data in which the random noise is added to the original sound. As shown in FIG. 16, it should be appreciated that the values of LRMS and RRMS are larger than the SM data and the SS data shown in FIG. 15. Specifically, among 3056 frames, the maximum value of LRMS is 371610 and the maximum value of RRMS is 371685. Hence, as for the first music data, 19 bits need to be assigned as an amount of information of LRMS, and 19 bits need to be assigned as an amount of information of RRMS, so that 38 bits in total per frame are needed as an amount of information. As described above, it should be appreciated that the amount of information which the metadata calculator 1 according to the present embodiment should assign to the metadata is considerably reduced compared with a noise detection method using the conventional effective value. Furthermore, although there is no sound between the frame 20 and the frame 29 in the noise detecting method using the effective value, large values are generated on LRMS and RRMS therebetween as shown in FIG. 16, resulting in waste of storage region.

Figure 17:
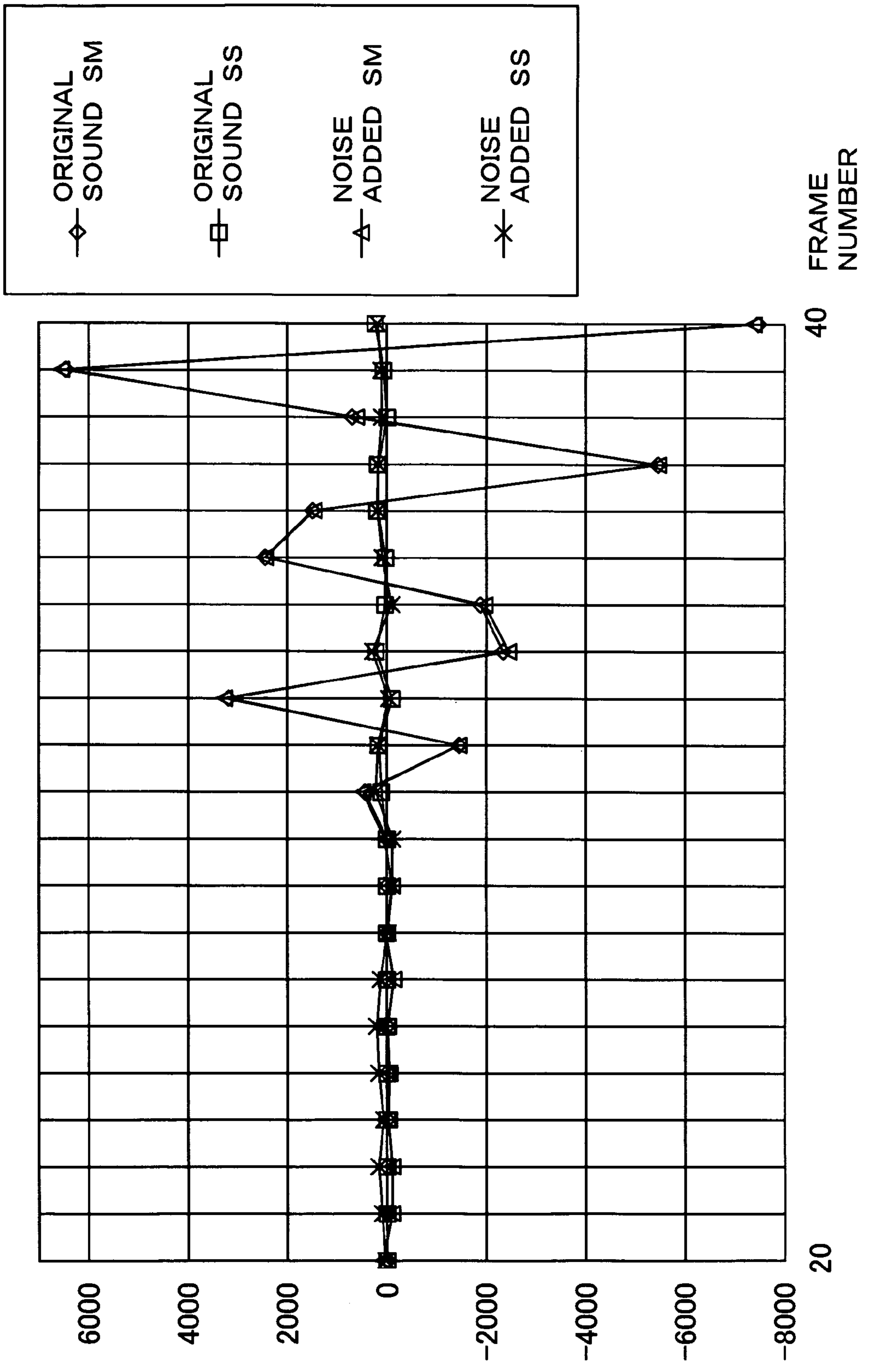
FIG. 17 is a graph showing a change in added data and subtracted data for every frame when a second music data is used.

Experimental results using the second music data will be then described. FIG. 17 is a graph showing a change in the added data and the subtracted data for every frame when the second music data is used. A horizontal axis indicates frames and a vertical axis indicates values of the SM data or SS data of each frame obtained by Equation (2) or Equation (3). A line indicated with diamonds is a graph that shows a change in SM data to the frames when the left audio data and the right audio data of the original sound are substituted in Equation (2). Although there are 1978 frame numbers in total, the frame number 20 to the frame number 40 are shown in the graph. A line indicated with squares is a graph that shows a change in SS data to the frames when the left audio data and the right audio data of the original sound are substituted in Equation (3).

The random noise has been added to leading two samples of the frames of the original sound also in this experiment. A line indicated with triangles is a graph that shows a change in SM data to the frames when the left audio data and the right audio data in which the random noise is added to the original sound are substituted in Equation (2). Additionally, a line indicated with X marks is a graph that shows a change in SS data to the frames when the left audio data and the right audio data in which the random noise is added to the original sound are substituted in Equation (3). Here, when the original sound SM data indicated with diamonds and the SM data indicated with triangles in which the random noise is added are matched with each other, and the original sound SS data indicated with squares and the SS data indicated with X marks in which the random noise is added are matched with each other, the added random noise cannot be detected. However, the random noise added without satisfying these conditions could be detected in all the frames of 1978.

Moreover, the maximum absolute value of the SM data indicated with triangles is larger than that of the SS data indicated with X marks, similar to the first music date. Among 1978 frames, the maximum absolute value of the SM data is 25134 and the maximum absolute value of the SS data is 2336. Hence, in this example, 16 bits including sign bits may be assigned as an amount of information of the SM data, and 13 bits including sign bits may be assigned as an amount of information of the SS data smaller than that.

Figure 18:
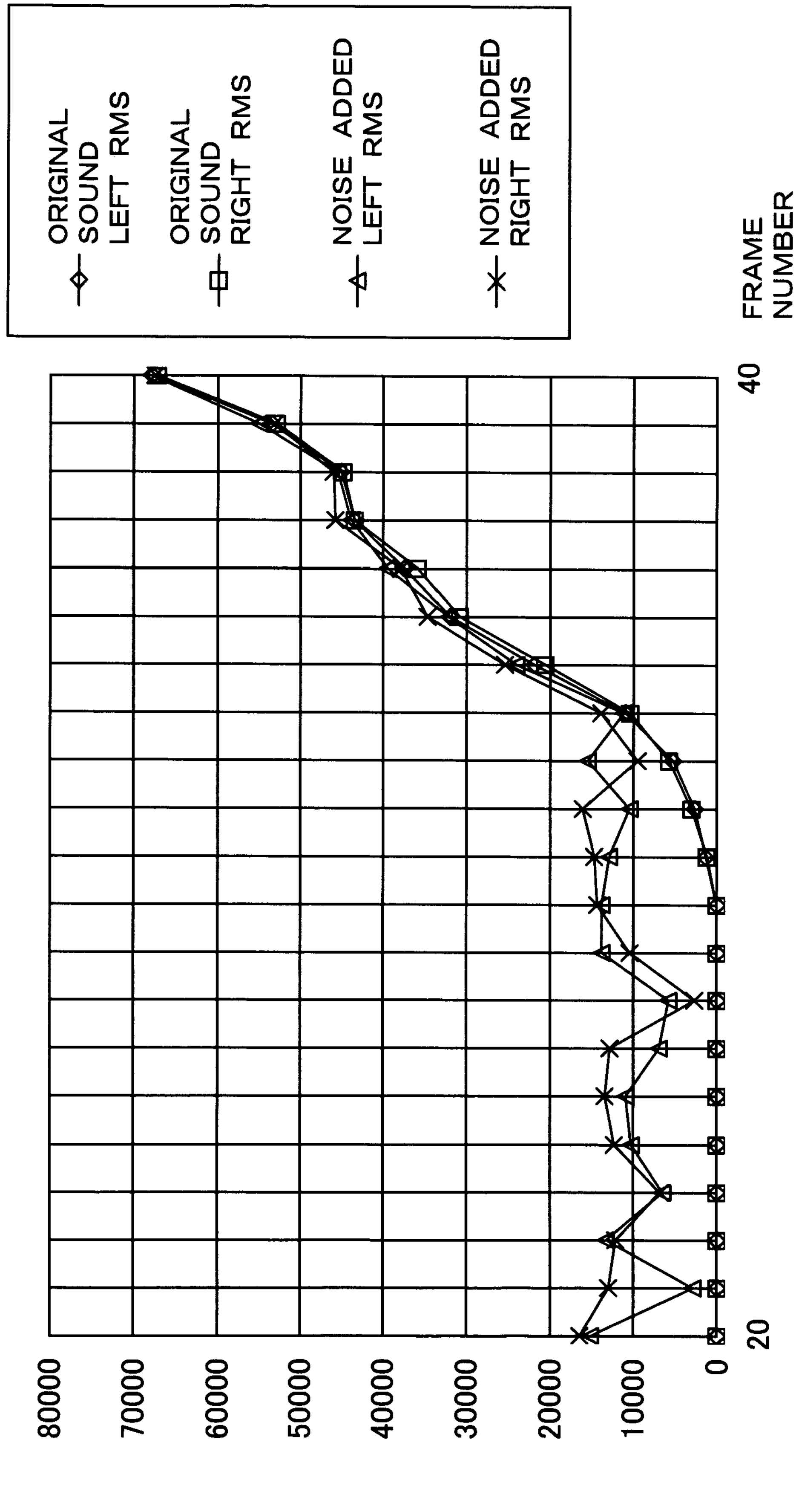
FIG. 18 is a graph showing a change in effective values of the left audio data and the right audio data for every frame when the second music data is used.

FIG. 18 is a graph showing a change in the effective values of the left audio data and the right audio data for every frame when the second music data is used. A horizontal axis indicates frames and a vertical axis indicates effective values. A line indicated with diamonds is a graph that shows a change in LRMS of the left audio data of the original sound to the frames. A line indicated with squares is a graph that shows a change in RRMS of the right audio data of the original sound to the frames. A line indicated with triangles is LRMS of the left audio data in which similar random noise is added to the original sound. Meanwhile, a line indicated with X marks is RRMS of the right audio data in which the random noise is added to the original sound. As shown in FIG. 18, it should be appreciated that the values of LRMS and RRMS are larger than the SM data and the SS data shown in FIG. 17. Specifically, among 1978 frames, the maximum value of LRMS is 220967 and the maximum value of RRMS is 213659. Hence, as for the second music data, 18 bits need to be assigned as an amount of information of LRMS, and 18 bits need to be assigned as an amount of information of RRMS, so that 36 bits in total per frame is needed as an amount of information. As described above, it should be appreciated that the amount of information which the metadata calculator 1 according to the present embodiment should assign to the metadata is considerably reduced compared with a noise detection method using the conventional effective value.

As this invention may be embodied in several forms without departing from the spirit of essential characteristics thereof, present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A transmitting/receiving method for receiving audio acoustic signals externally transmitted at a transmitter/receiver, and externally transmitting the received audio acoustic signals from the transmitter/receiver, the method comprising the steps of acquiring a first audio acoustic signal and a second audio acoustic signal of the received audio acoustic signals;

calculating a value on a time-series sum signal of the first audio acoustic signal and the second audio acoustic signal to calculate added data based on an accumulated value for a predetermined time of the calculated values;

calculating a value on a time-series difference signal between the first audio acoustic signal and the second audio acoustic signal to calculate subtracted data based on an accumulated value for a predetermined time of the calculated values;

adding the added data and the subtracted data to audio acoustic signals received as metadata; and externally transmitting the audio acoustic signals to which the metadata is added.

2. A transmitter/receiver for receiving audio acoustic signals externally transmitted, and externally transmitting the received audio acoustic signals, the transmitter/receiver comprising:

an acquiring unit for acquiring a first audio acoustic signal and a second audio acoustic signal of the received audio acoustic signals;

an adding unit for calculating a value on a time-series sum signal of the first audio acoustic signal and the second audio acoustic signal acquired by the acquiring unit to calculate added data based on an accumulated value for a predetermined time of the calculated values;

a subtracting unit for calculating a value on a time-series difference signal between the first audio acoustic signal and the second audio acoustic signal acquired by the acquiring unit to calculate subtracted data based on an accumulated value for a predetermined time of the calculated values;

an addition unit for adding the added data and the subtracted data calculated by the adding unit and the subtracting unit to the audio acoustic signals received as metadata; and a transmission unit for externally transmitting the audio acoustic signals to which the metadata is added by the addition unit.

3. The transmitter/receiver according to claim 2, wherein when the received audio acoustic signals include a plurality of audio acoustic signals exceeding the first audio acoustic signal and the second audio acoustic signal, the acquiring unit is configured so as to convert the plurality of audio acoustic signals into the first audio acoustic signal and the second audio acoustic signal.

4. The transmitter/receiver according to claim 2, further comprising an identification information addition unit for adding identification information assigned in advance to the added data and the subtracted data calculated by the adding unit and the subtracting unit.

5. The transmitter/receiver according to claim 4, further comprising:

an extracting unit for extracting the added data and the subtracted data which are added in advance to the received audio acoustic signals; and a detecting unit for detecting malfunctions of the received audio acoustic signals based on the added data or the subtracted data extracted by the extracting unit, and the added data or the subtracted data calculated by the adding unit or the subtracting unit.

6. The transmitter/receiver according to claim 2, wherein an amount of information assigned to the subtracted data is equal to an amount of information assigned to the added data or less.

7. A recording medium used for a transmitter/receiver for receiving audio acoustic signals externally transmitted, and externally transmitting the audio acoustic signals, the recording medium being capable of being read by the transmitter/receiver, comprising the steps of: calculating a value on a time-series sum signal of a first audio acoustic signal and a second audio acoustic signal acquired from the received audio acoustic signals to calculate added data based on an accumulated value for a predetermined time of the calculated values; calculating a value on a time-series difference signal between the first audio acoustic signal and the second audio acoustic signal acquired from the received audio acoustic signals to calculate subtracted data based on an accumulated value for a predetermined time of the calculated values; and adding the added data and the subtracted data to the audio acoustic signals received as metadata.

* * * * *